United States Patent
Abeloe

(10) Patent No.: US 10,627,820 B1
(45) Date of Patent: *Apr. 21, 2020

(54) CONTROLLER SYSTEMS AND METHODS OF LIMITING THE OPERATION OF NEURAL NETWORKS TO BE WITHIN ONE OR MORE CONDITIONS

(71) Applicant: Apex Artificial Intelligence Industries, Inc., Centreville, VA (US)

(72) Inventor: Kenneth A. Abeloe, Carlsbad, CA (US)

(73) Assignee: Apex Artificial Intelligence Industries, Inc., Centreville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,434

(22) Filed: Apr. 26, 2019

Related U.S. Application Data

(63) Continuation of application No. 15/991,769, filed on May 29, 2018, now Pat. No. 10,324,467, and a
(Continued)

(51) Int. Cl.
*G05D 1/00* (2006.01)
*B60R 11/02* (2006.01)
(Continued)

(52) U.S. Cl.
CPC ........ *G05D 1/0088* (2013.01); *B60R 11/0217* (2013.01); *B60R 11/04* (2013.01);
(Continued)

(58) Field of Classification Search
CPC ..................................................... B60Q 5/006
See application file for complete search history.

(56) References Cited

U.S. PATENT DOCUMENTS

| 5,048,100 A | 9/1991 | Kuperstein |
| 5,179,631 A | 1/1993 | Guddanti et al. |

(Continued)

FOREIGN PATENT DOCUMENTS

CN 101763033 12/2009

OTHER PUBLICATIONS

"The Internet of Things: Opportunities and Applications across Industries—Discussion Summary" International Institute for Analytics, 8 pages (Dec. 2015).
(Continued)

*Primary Examiner* — Feng-Tzer Tzeng
(74) *Attorney, Agent, or Firm* — Knobbe, Martens, Olson & Bear LLP

(57) ABSTRACT

Systems and methods for automatically self-correcting or correcting in real-time one or more neural networks after detecting a triggering event, or breaching boundary conditions are provided. Such a triggering event may indicate incorrect output signal or data being generated by the one or more neural networks. In particular, machine controllers of the invention limit the operations of neural networks to be within boundary conditions. Autonomous machines of the invention can be self-corrected after a breach of a boundary condition is detected. Autonomous land vehicles of the invention are capable of determining the timing of automatic transition to the manual control from automated driving mode. The controller of the invention filters and saves input-output data sets that fall within boundary conditions for later training of neural networks. The controllers of the invention include security architectures to prevent damages from virus attacks or system malfunctions.

21 Claims, 18 Drawing Sheets

Related U.S. Application Data continuation-in-part of application No. 16/363,183, filed on Mar. 25, 2019, which is a continuation of application No. 15/997,031, filed on Jun. 4, 2018, now Pat. No. 10,242,665, application No. 16/396, 434, which is a continuation of application No. 16/377,964, filed on Apr. 8, 2019, which is a continuation of application No. 15/997,192, filed on Jun. 4, 2018, now Pat. No. 10,254,760, and a continuation-in-part of application No. 16/363,183, filed on Mar. 25, 2019, which is a continuation of application No. 15/991,769, filed on May 29, 2018, now Pat. No. 10,324,467, and a continuation-in-part of application No. 15/997,192, filed on Jun. 4, 2018, now Pat. No. 10,254,760, application No. 16/396,434, which is a continuation-in-part of application No. 16/377,964, filed on Apr. 8, 2019, which is a continuation-in-part of application No. 16/363,183, filed on Mar. 25, 2019, and a continuation-in-part of application No. 15/991, 769, filed on May 29, 2018, now Pat. No. 10,324,467.

(60) Provisional application No. 62/659,359, filed on Apr. 18, 2018, provisional application No. 62/630,596, filed on Feb. 14, 2018, provisional application No. 62/612,008, filed on Dec. 29, 2017.

(51) Int. Cl.

| | |
|---|---|
| *G06N 3/04* | (2006.01) |
| *G06N 3/08* | (2006.01) |
| *B60R 11/04* | (2006.01) |
| *G05D 1/02* | (2020.01) |
| *G10L 13/04* | (2013.01) |
| *B60Q 5/00* | (2006.01) |

(52) U.S. Cl.
CPC .......... *G05D 1/0221* (2013.01); *G06N 3/0454* (2013.01); *G06N 3/08* (2013.01); *G10L 13/043* (2013.01); *B60Q 5/006* (2013.01); *B60R 2300/102* (2013.01); *B60R 2300/103* (2013.01)

(56) References Cited

U.S. PATENT DOCUMENTS

| | | | |
|---|---|---|---|
| 5,668,926 | A | 9/1997 | Karaali |
| 5,845,271 | A | 12/1998 | Thaler |
| 5,870,729 | A | 2/1999 | Yoda |
| 6,574,754 | B1 * | 6/2003 | Smith .................... G11B 27/36 706/26 |
| 7,063,476 | B1 | 6/2006 | Mims |
| 7,800,490 | B2 | 9/2010 | Allen et al. |
| 7,979,173 | B2 | 7/2011 | Breed |
| 8,677,071 | B2 | 3/2014 | Gibson et al. |
| 8,775,341 | B1 | 7/2014 | Commons |
| 8,782,653 | B2 | 7/2014 | Gibson et al. |
| 8,892,485 | B2 | 11/2014 | Aparin et al. |
| 9,460,382 | B2 | 10/2016 | Canoy et al. |
| 9,875,440 | B1 * | 1/2018 | Commons .......... G01C 21/3602 |
| 2003/0217021 | A1 * | 11/2003 | Jacobson ............ F02D 41/1405 706/16 |
| 2009/0276385 | A1 | 11/2009 | Hill |
| 2012/0259804 | A1 | 10/2012 | Brezzo et al. |
| 2013/0073497 | A1 | 3/2013 | Akopyan et al. |
| 2013/0141233 | A1 | 6/2013 | Jacobs et al. |
| 2013/0231824 | A1 | 9/2013 | Wilson et al. |
| 2013/0325776 | A1 | 12/2013 | Ponulak et al. |
| 2014/0156568 | A1 | 6/2014 | Ganguly et al. |
| 2015/0042491 | A1 * | 2/2015 | Burnison .................. B60Q 1/52 340/902 |

OTHER PUBLICATIONS

Bengio et al., "Greedy Layer-Wise Training of Deep Networks," University of Montreal, 8 pages.

Broomhead et al., "Radial Basis Functions, Multi-Variable Functional Interpolation and Adaptive Networks," Royal Signals & Radar Establishment, RSRE Memorandum No. 4148, 39 pages (Mar. 28, 1988).

Chang et al., "CLKN: Cascaded Lucas-Kanade Networks for Image Alignment," 9 pages (2017).

Chen et al., "Big Data Deep Learning: Challenges and Perspectives," *IEEE Access*, vol. 2, pp. 514-525 (2014).

Chen et al., "DeepDriving: Learning Affordance for Direct Perception in Autonomous Driving," Princeton University paper, 9 pages.

Chung et al., "Empirical Evaluation of Gated Recurrent Neural Networks on Sequence Modeling," University of Montreal, arXiv:1412.3555v1, 9 pages (Dec. 11, 2014).

Cortes et al., "Support-Vector Networks," *Machine Learning*, 20, pp. 273-297 (1995).

Dai et al., "Dynamic Learning from Adaptive Neural Network Control of a Class of Nonaffine Nonlinear Systems," *IEEE Transactions on Neural Networks and Learning Systems*, vol. 25, No. 1 (Jan. 2014).

Desai et al., "A Survey of Image Registration Techniques Using Neural Networks", *Int'l Journal of Computer Sciences & Engineering*, vol. 3(12), pp. 57-60 (Dec. 2015).

Dixit et al., "Autonomous Vehicles: Disengagements, Accidents and Reaction Times," *Plos One*, 15 pages (Dec. 20, 2016).

Durrant-Whyte et al., "Simultaneous Localization and Mapping: Part I," *IEEE Robotics & Automation Magazine*, 10 pages (Jun. 2006).

Durrant-Whyte et al., "Simultaneous Localization and Mapping: Part II," *IEEE Robotics & Automation Magazine*, 10 pages (Sep. 2006).

Elman, J.L., "Finding Structure in Time," *Cognitive Science* 14, pp. 179-211 (1990).

Eykholt et al., "Robust Physical-World Attacks on Deep Learning Visual Classification," arXiv:1707.08945v5, 11 pages (Apr. 10, 2018).

Fischer et al. "Descriptor Matching with Convolution Neural Networks: a Comparison to SIFT," arXiv:1405.5769v1, 10 pages (May 22, 2014).

Florian, R.V., "Reinforcement learning through modulation of spike-timing-dependent synaptic plasticity," Center for Cognitive and Neural Studies, Romania, 36 pages.

Freuder E.C., "Explaining Ourselves: Human-Aware Constraint Reasoning," Proceedings of the 31st AAAI Conference on Artificial Intelligence (AAAI-17), pp. 4858-4862 (2017).

Gao et al., "Unsupervised learning to detect loops using deep neural networks for visual SLAM system," *Auton Robot* 41, pp. 1-18 (2017).

Goodfellow et al., "Explaining and Harnessing Adversarial Examples," published as a conference paper at ICLR 2015, ArXiv:1412.6572v3, 11 pages (Mar. 20, 2015).

Goodfellow et al., "Generative Adversarial Nets," University of Montreal, arXiv:1406.2661v1, 9 pages (Jun. 10, 2014).

Graves et al., "Neural Turing Machines," Google DeepMind, London, United Kingdom, arXiv:1410.5401v2, 26 pages (Dec. 10, 2014).

Han et al., "A structure optimisation algorithm for feedforward neural network construction," *Neurocomputing*, 99, pp. 347-357 (2013).

He et al., "Deep Residual Learning for Image Recognition," arXiv:1512.03385v1, 12 pages (Dec. 10, 2015).

Hinton et al., "Learning and Relearning in Boltzmann Machines," Chapter 7, Basic Mechanics, pp. 282-317.

Hopfield, J.J., "Neural Networks and Physical Systems with Emergent Collective Computational Abilities," *PNAS* vol. 79, pp. 2554-2558 (Apr. 1982).

Huval et al., "An Empirical Evaluation of Deep Learning on Highway Driving," arXiv:154:01716v3, 7 pages (Apr. 17, 2015).

(56) References Cited

OTHER PUBLICATIONS

Jaeger et al., "Harnessing Nonlinearity: Predicting Chaotic Systems and Saving Energy in Wireless Communication," *Science* 304, 78, 4 pages (2004).
Kim, G.K., "Deep Learning," book review, *Healthcare Informatics Research*, 2016 The Korean Society of Medical Informatics, vol. 22, No. 4. pp. 351-354 (2016).
Kingma et al., "Auto-Encoding Variational Bayes," arXiv:1312.6114v10, 14 pages (May 1, 2014).
Kohonen, T., "Essentials of the self-organizing map," *Neural Networks* 37, pp. 52-65 (2013).
Kohonen, T., "Self-Organized Formation of Topologically Correct Feature Maps," *Biol. Cybern.* 43, pp. 59-69 (1982).
Kulkarni et al., "Deep Convolutional Inverse Graphics Network," arXiv:1503.03167v4, 10 pages (Jun. 22, 2015).
LeCUN et al., "Deep Learning—Review" *Nature*, vol. 521, pp. 436-444 (May 28, 2015).
LeCun et al., "Gradient-Based Learning Applied to Document Recognition," *Proc. of the IEEE*, pp. 1-46 (Nov. 1998).
Libelium Smart World, 1 page, downloaded Jun. 2, 2018, www.libelium.com.
Ma et al., "Multimodal Convolutional Neural Networks for Matching Image and Sentence," ICCV paper, pp. 2623-2631 (2015).
Maass et al., "Real-Tim Computing Without Stable States: A New Framework for Neural Computation Based on Perturbations," *Neural Computation* 14, pp. 2531-2560 (2002).
Mehri et al., "SampleRNN: An Unconditional End-to-End Neural Audio Generation Model," published as a conference paper at ICLR 2017, arXiv:1612.07837v2, 11 pages (Feb. 11, 2017).
Nasr et al., "Neural network control of nonlinear dynamic systems using hybrid algorithm—Review article", *Applied Soft Computing* 24, pp. 423-431 (2014).
Oh et al., "A design of granular-oriented self-organizing hybrid fuzzy polynomial neural networks," *Neurocomputing*, 119, pp. 292-307 (2013).
Pecevski et al., "Probabilistic Inference in General Graphical Models through Sampling in Stochastic Networks of Spiking Neurons," *PloS Computational Biology*, vol. 7, Issue 12, 1-25 (Dec. 2011).
Rahman et al., "Emerging Technologies with Disruptive Effects: A Review," *Perintis eJournal*, vol. 7, No. 2, pp. 111-128 (2017).
Ranzato et al., "Efficient Learning of Sparse Representations with an Energy-Based Model," Courant Institute of Mathematical Sciences, New York University, 8 pages.
Rosenblatt, F., "The Perceptron: A Probabilistic Model for Information Storage and Organization in the Brain," *Psychological Review*, vol. 65, No. 6, pp. 386-408 (1958).
Schuster et al., "Bidirectional Recurrent Neural Networks," *IEEE Transactions on Signal Processing*, vol. 45, No. 11, pp. 2673-2681 (Nov. 1997).
Seff et al., "Learning from Maps: Visual Common Sense for Autonomous Driving," arXiv:1611.08583v1, 7 pages (Nov. 25, 2016).
Smolensky, P., "Information Processing in Dynamical Systems: Foundations of Harmony Theory," University of Colorado at Boulder, Department of Computer Science, 56 pages (Feb. 1986).
Svetlov et al., "A New Implementation of the Algorithm of Adaptive Construction of Hierarchical Neural Network Classifiers," *Optical Memory and Neural Networks* (*Information Optics*), vol. 24, No. 4, pp. 288-294 (2015).
Svetlov et al., "Development of the Algorithm of Adaptive Construction of Hierarchical Neural Network Classifiers," *Optical Memory and Neural Networks* (*Information Optics*), vol. 26, No. 1, pp. 40-46 (2017).
Szegedy et al., "Intriguing properties of neural networks," arXiv:1312.6199v4, 10 pages (Feb. 19, 2014).
Wang, Y., "Deep Learning in Real Time—Inference Acceleration and Continuous Training," 17 pages, downloaded Dec. 28, 2017, https://medium.com/@Synced/deep-learning-in-real-time-inference-acceleration-and-cont . . . .
Zeiler et al., "Deconvolutional Networks," Dept. of Computer Science, Courant Institute, New York University, 8 pages.
Zhou et al., "VoselNet: End-to-End Learning for Point Cloud Based 3D Object Detection," arXiv:1711.06396v1, 10 pages (Nov. 17, 2017).

\* cited by examiner

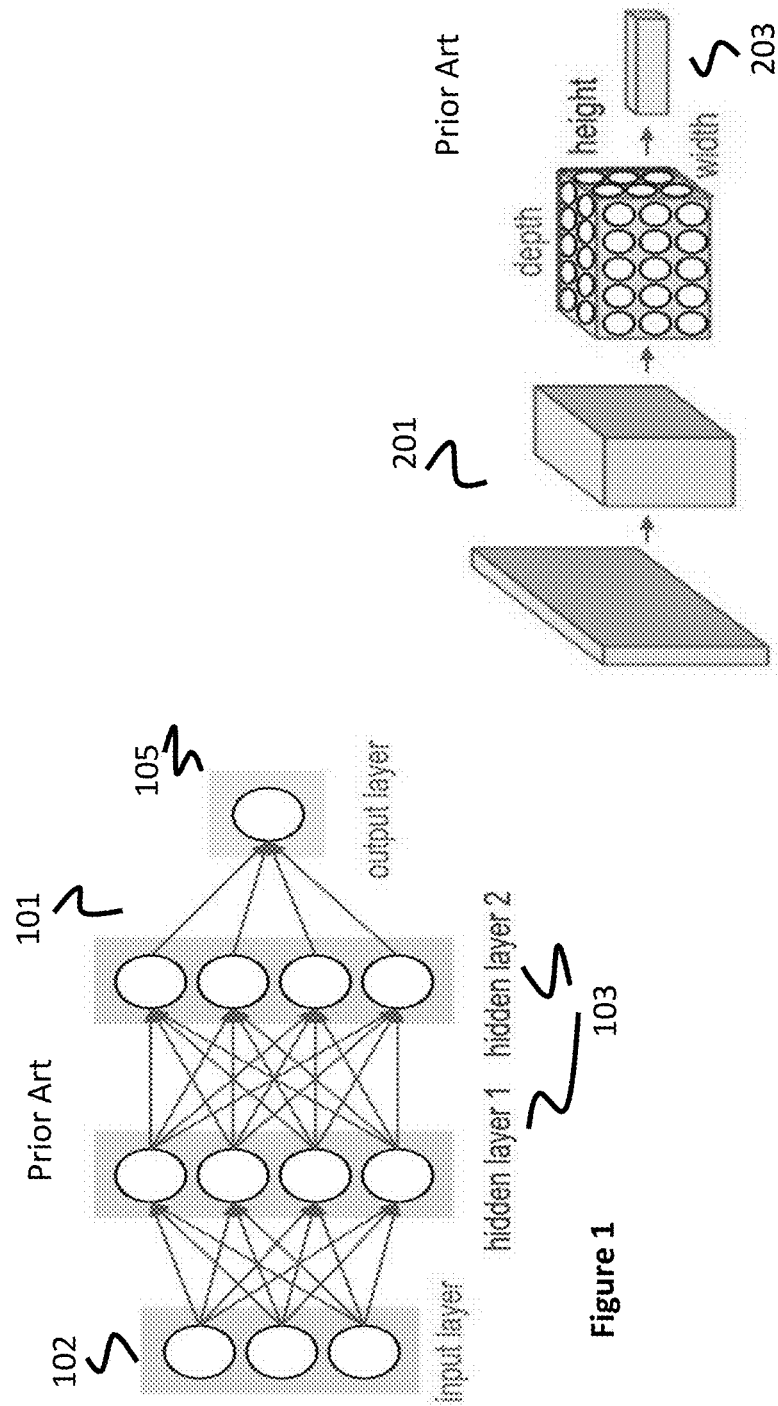

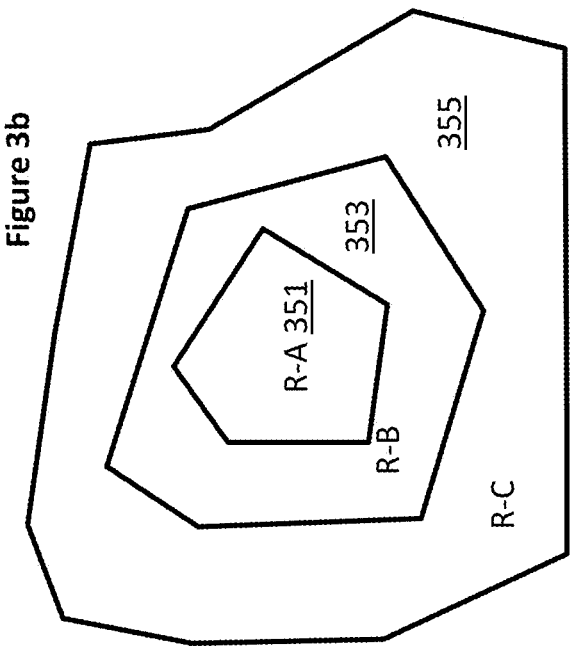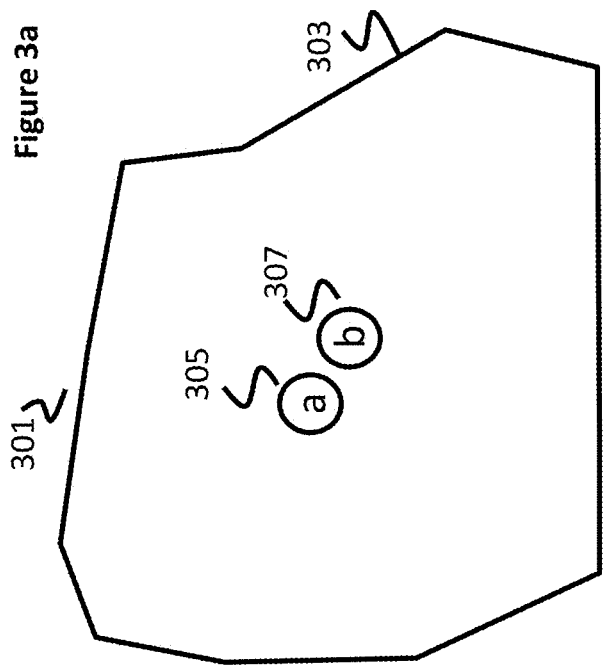

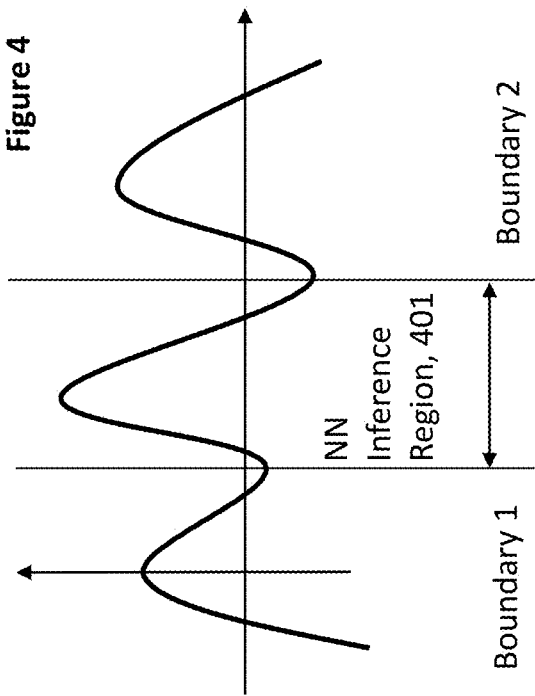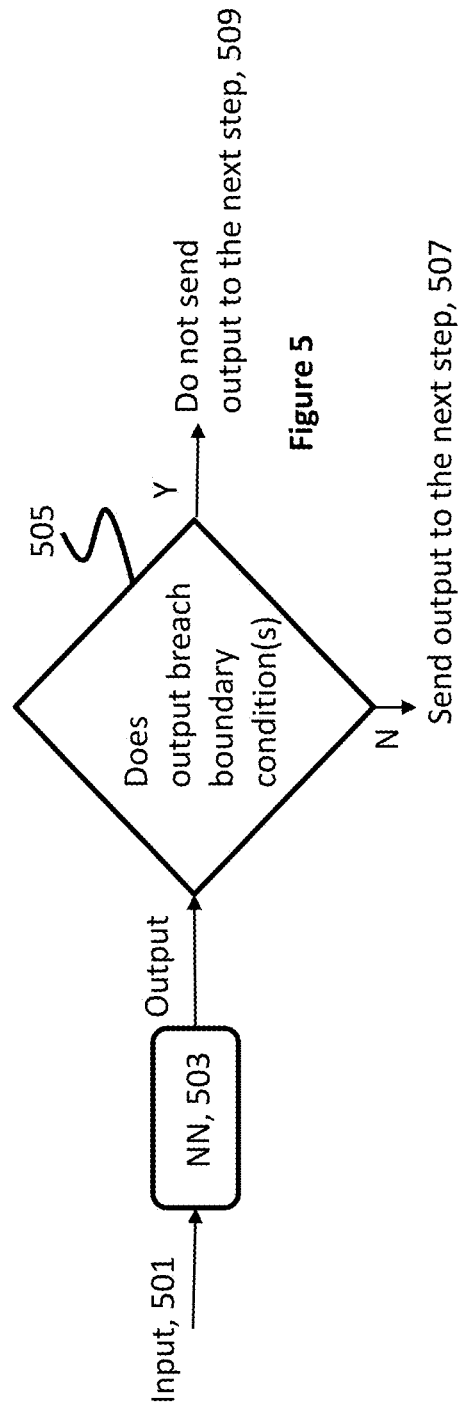

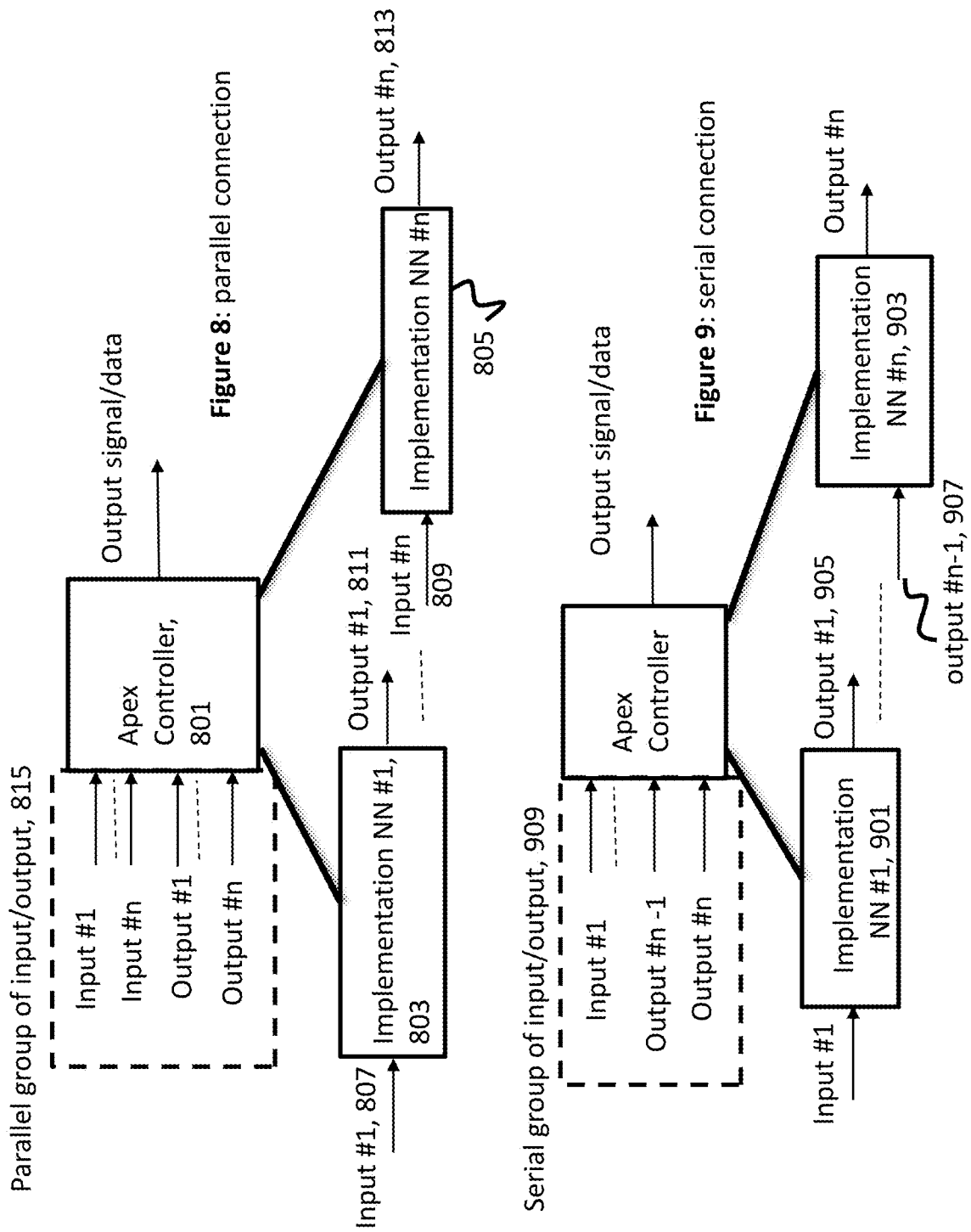

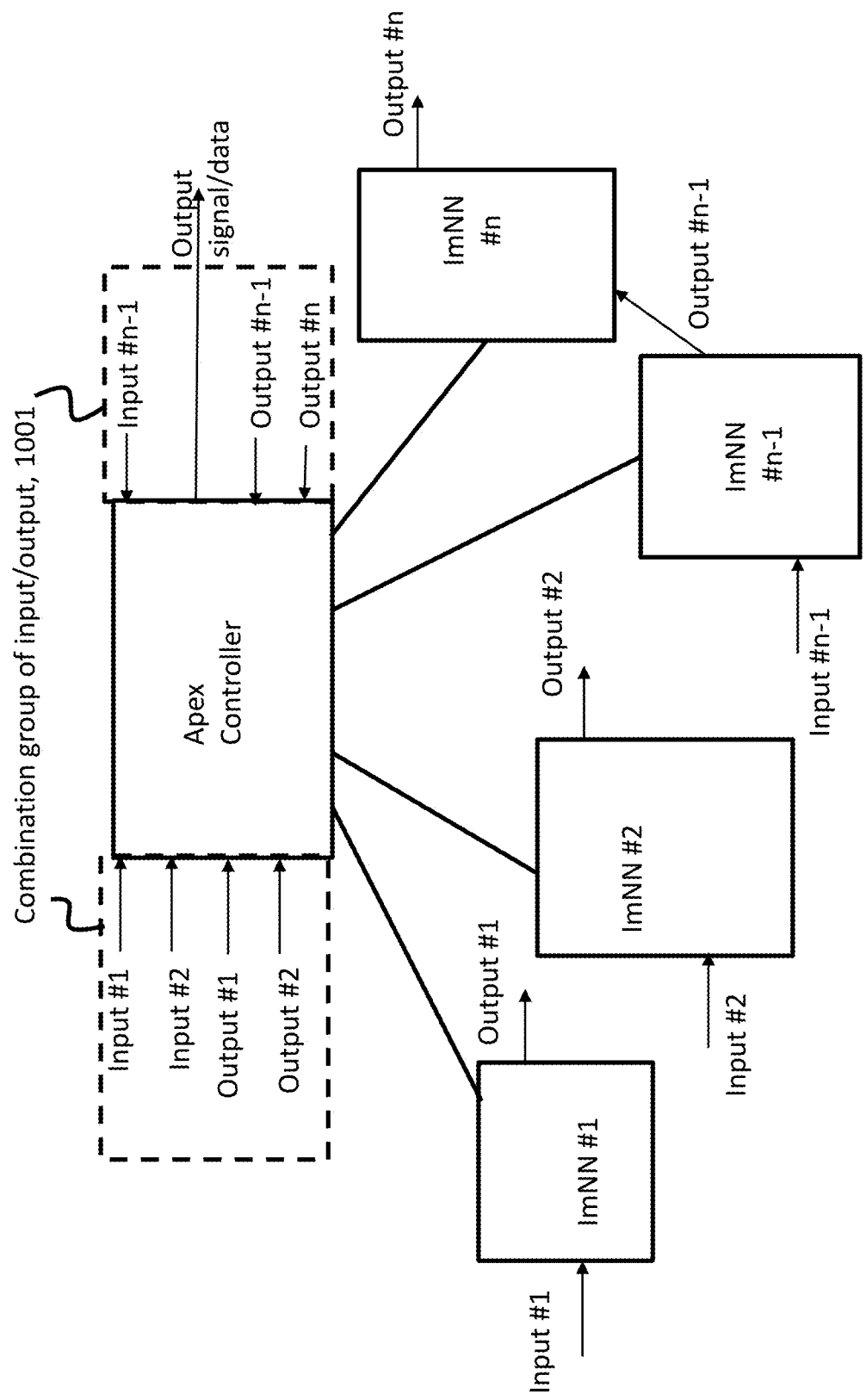
Figure 10: combination of parallel and serial connections

Figure 13: Updated NN with incremental training set (counters catastrophic forgetting)

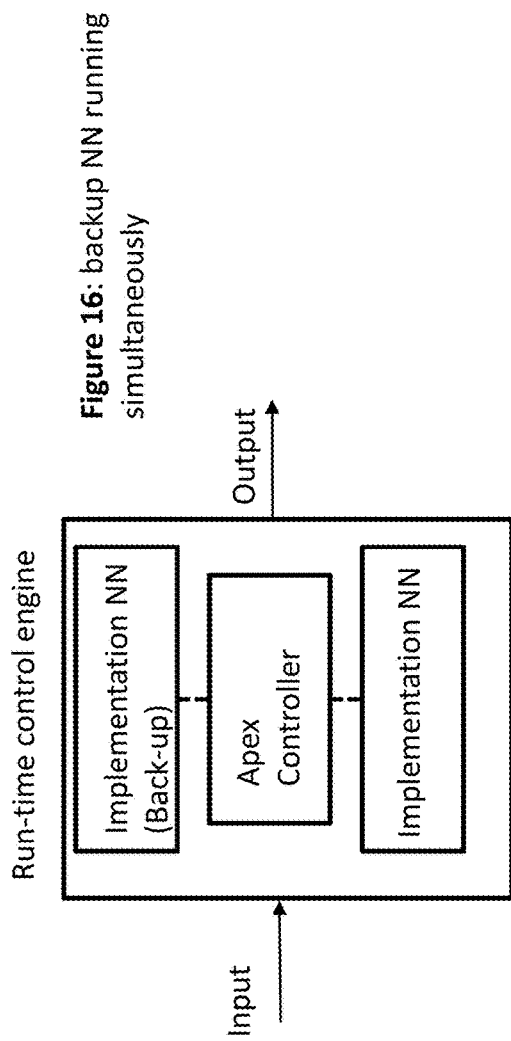
Figure 16: backup NN running simultaneously
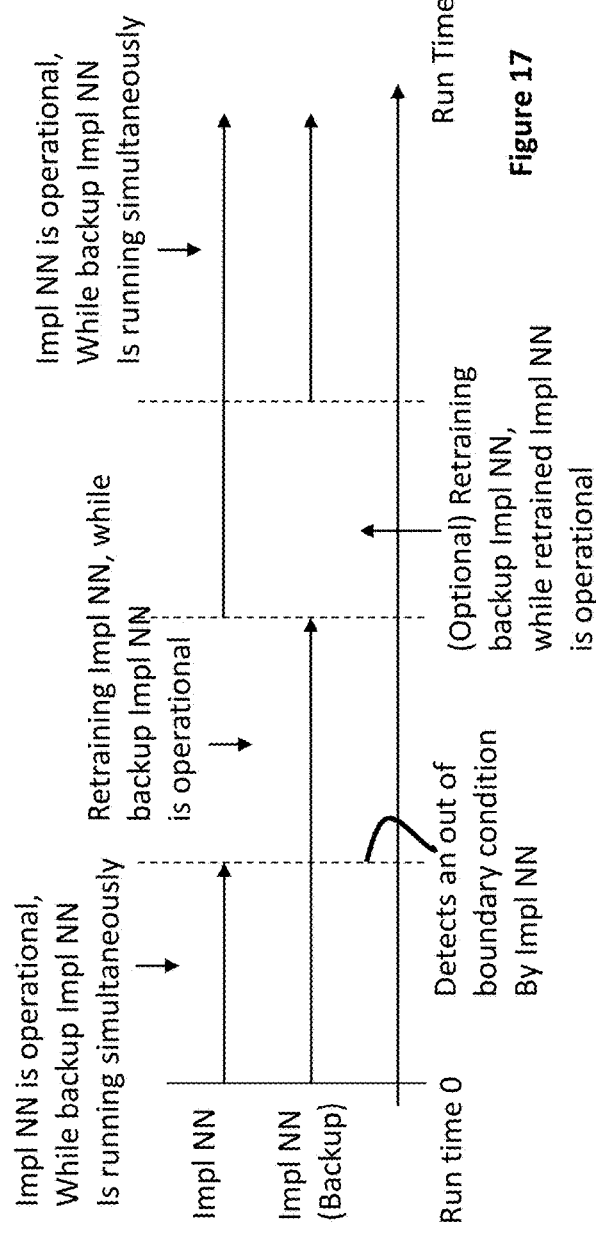
Figure 17

Figure 18: ImNN implementation using dynamically linked libraries

Figure 19 Flowchart

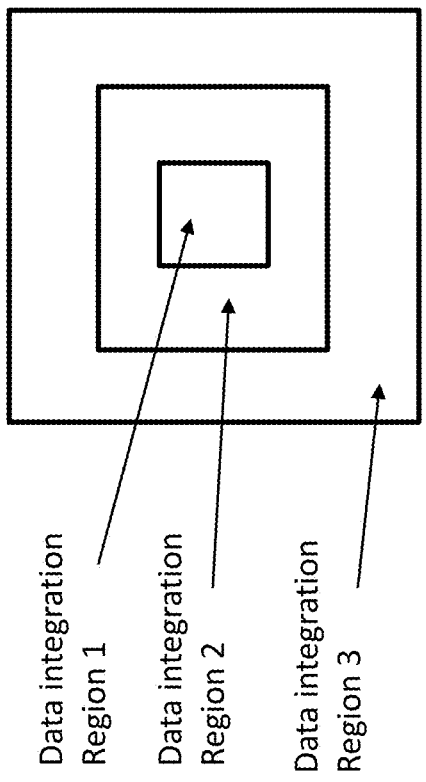
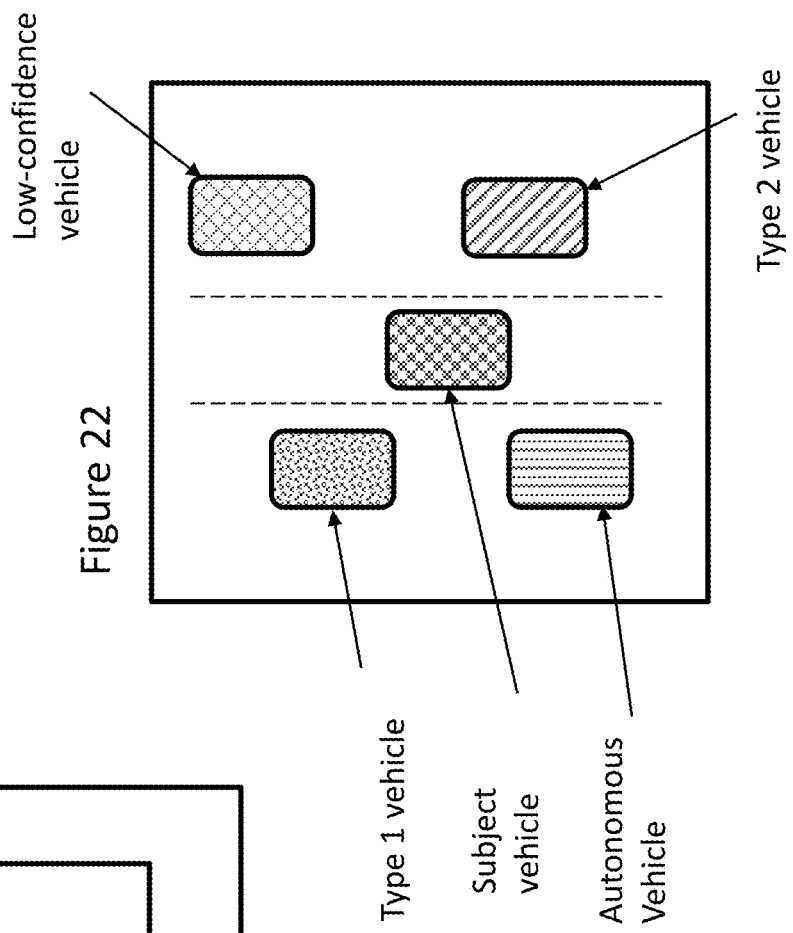

Automobile controller flowchart

CONTROLLER SYSTEMS AND METHODS OF LIMITING THE OPERATION OF NEURAL NETWORKS TO BE WITHIN ONE OR MORE CONDITIONS

RELATED APPLICATIONS

This application is a continuation of U.S. patent application Ser. No. 15/991,769, filed May 29, 2018, which claims the benefit of U.S. Provisional Application No. 62/612,008, filed Dec. 29, 2017, U.S. Provisional Application No. 62/630,596, filed Feb. 14, 2018, and U.S. Provisional Application No. 62/659,359, filed Apr. 18, 2018. This application is also a continuation-in-part of U.S. application Ser. No. 16/363,183, filed Mar. 25, 2019, which is a continuation of U.S. application Ser. No. 15/997,031, filed Jun. 4, 2018, now U.S. Pat. No. 10,242,665, which claims the benefit of U.S. Provisional Application No. 62/612,008, filed Dec. 29, 2017, U.S. Provisional Application No. 62/630,596, filed Feb. 14, 2018, and U.S. Provisional Application No. 62/659,359, filed Apr. 18, 2018. This application is also a continuation-in-part of U.S. application Ser. No. 16/377,964, filed on Apr. 8, 2019, which is a continuation of U.S. application Ser. No. 15/997,192, filed Jun. 4, 2018, now U.S. Pat. No. 10,254,760, which claims the benefit of U.S. Provisional Application No. 62/612,008, filed Dec. 29, 2017, U.S. Provisional Application No. 62/630,596, filed Feb. 14, 2018, and U.S. Provisional Application No. 62/659,359, filed Apr. 18, 2018. U.S. application Ser. No. 16/377,964 is also a continuation-in-part of U.S. patent application Ser. No. 15/991,769. U.S. application Ser. No. 16/377,964 is also a continuation-in-part of U.S. application Ser. No. 16/363,183. U.S. application Ser. No. 16/363,183 is also a continuation-in-part of U.S. application Ser. No. 15/991,769. U.S. application Ser. No. 16/363,183 is also a continuation-in-part of U.S. application Ser. No. 15/997,192. Each of the above-listed applications is incorporated by reference herein in their entirety.

TECHNICAL FIELD

This invention relates to automatically self-correcting or correcting in real-time one or more neural networks after detecting a triggering event, or breaching a boundary condition, that may indicate an incorrect output signal or data being generated by the one or more neural networks.

BACKGROUND

As illustrated in FIG. 1, a conventional Neural Network (NN) 101 receives an input (a single vector, in this example) at an input layer 102, and transforms it through a series of hidden layers 103. Each hidden layer is made up of a set of "neurons" or "nodes," where each neuron is fully connected to all neurons in the previous layer, and where neurons in a single layer function completely independently and do not share any connections. The last fully-connected layer is called the "output layer" 105, and in classification the output layer setting(s) represents the class scores.

As illustrated in FIG. 2, a "convolutional" Neural Network 201 can take 3D images as input, for instance. In particular, unlike the neural network described in connection with FIG. 1, the layers of a convolutional neural network have neurons arranged in 3 dimensions: width, height, depth. Note that the word depth here refers to the third dimension of an activation volume, not to the depth of a full neural network, which can refer to the total number of layers in a network. The neurons in a layer can be configured to be connected to a small region of the layer before it, instead of all of the neurons in a fully-connected manner. The convolutional neural network reduces the full image into a single vector of class scores 205, arranged along the depth dimension.

Although advances have been made in prior art neural networks, once a prior art neural network is trained using training data, a conventional neural network system is incapable of effectively recognizing or determining when incorrect output is generated. This shortcoming of a conventional system is compounded by the lack of the conventional systems having effective mechanisms to take corrective measures when incorrect output is generated. These shortcomings prevent conventional systems from adaptively reducing mistakes or incorrect output with new information (e.g., training with new data).

BRIEF DESCRIPTION OF THE DRAWINGS

FIG. 1 is a schematic diagram illustrating a prior art neural network with hidden layers;

FIG. 2 is a schematic diagram illustrating a prior art convolutional neural network;

FIG. 3a is a diagram illustrating a two-dimensional decision space with two potential classification groupings;

FIG. 3b is a diagram illustration a two-dimensional decision space with multiple boundary condition regions;

FIG. 4 is a diagram illustrating a one-dimensional decision space with two potential classification groupings;

FIG. 5 is a flow chart illustrating a set of steps in using boundary conditions in a control system;

FIG. 8 is a block diagram illustrating a embodiment of a run-time engine that includes parallel connected ImNNs;

FIG. 9 is a block diagram illustrating a embodiment of the present invention controller connected to ImNNs in series;

FIG. 10 is a block diagram illustrating a embodiment of the present invention controller connected to ImNNs in a combination of parallel and serial connections;

FIG. 16 is a block diagram illustrating a embodiment of a run-time engine that includes a back-up ImNN running simultaneously with an ImNN;

FIG. 17 is a timing diagram illustrating sequence of events in exchanging an operational ImNN with a backup ImNN;

FIG. 21 is a diagram illustrating multiple regions of mapping for automatic navigation;

FIG. 22 is a diagram illustrating a display screen showing characteristics of nearby vehicles;

SUMMARY OF CERTAIN INVENTIVE ASPECTS

Figure 6:
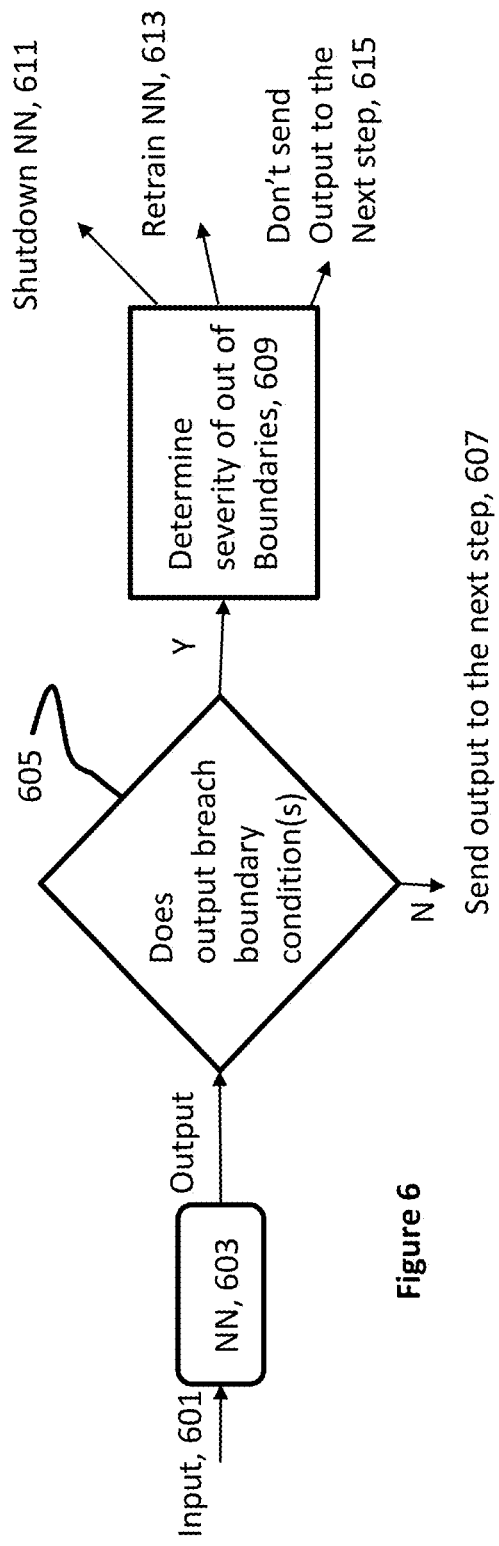
FIG. 6 is a flow chart illustrating a set of steps in using boundary conditions in a control system and determining follow-up options.

Various aspects of the present invention includes inventive features and embodiments to allow machine controllers to limit the operations of neural networks to be within a set of outputs or a condition. For example, the condition may be a boundary condition. Such features and embodiments allow autonomous machines be self-corrected after a breach of a boundary condition is detected. In various examples of embodiments, a "self-correction" may be to make autonomous land vehicles be capable of determining the timing of automatic transition to the manual control from automated driving mode, to configure controllers to filter and save input-output data sets that fall within boundary conditions for later training of neural networks, and/or to provide security architectures to prevent damages from virus attacks or system malfunctions.

Certain embodiments of the present invention include a controller for an autonomous machine having a plurality of sensors. The controller includes a first neural network deployed on the autonomous machine, trained to generate predictable output (i.e., output from inferencing) for a given set of input with a first training data set that includes training data generated by other autonomous machines. The controller may also include a first controller coupled to the first neural network. The first controller may include a detector adapted to process the input and output data of the first neural network and to detect a first event; and a neural network manager coupled to the first neural network and adapted to re-train the first neural network incrementally using a second training data set generated by the sensors on the autonomous machine. The neural network manager can be adapted to re-train the first neural network incrementally using the second training data set.

In some embodiments, a second neural network is instantiated on a different virtual machine from a virtual machine on which the first neural network is instantiated. In some other embodiments, the first and second neural network run at the same time using the same input data set. In such embodiments, if different output data are generated by the two neural nets generated, the first neural net is placed off-line while running only the second neural network.

In certain embodiments, the first controller further includes a data filter and DBMS. The data filter selects input-output data pairs to be stored at the DBMS to be used as training data set. The DBMS can also store and retrieve the initial nodal values of the first neural network and subsequent nodal values after the re-training. In some embodiments, the data filter may cause the DBMS to store only those input-output combinations when the outputs do not cause a triggering event (e.g., outputs being within boundary conditions). In these embodiments, the subsequent re-training can be more efficiently conducted because only the "training" data set is within the boundary conditions.

Some embodiments include method steps for controlling an autonomous machine having a plurality of sensors, the steps comprise initiating a first neural network deployed on the autonomous machine, the first neural network trained to generate predictable output (i.e., output from inferencing) for a given set of input with a first training data set that includes training data generated by other autonomous machines, and executing instructions for a first controller coupled to the first neural network. The executing instruction step for a first controller may further include executing instructions for a detector adapted to process the input and output data of the first neural network and to detect a first event, and executing instructions for a neural network manager coupled to the first neural network and adapted to re-train the first neural network incrementally using a second training data set generated by the sensors on the autonomous machine. The first event can be a virus attack.

Certain embodiments include an apparatus to control an autonomous land vehicle moving in traffic with other land vehicles. The apparatus may include a first camera mounted on the autonomous land vehicle and located to capture image with a wide angle view that includes a front view and at least one side view, a second camera mounted on a front side of the autonomous land vehicle and located to capture images with a view from the front side of the autonomous land vehicle, and a third camera mounted on the at least one side of the autonomous land vehicle to capture images from the at least one side of the autonomous land vehicle. The apparatus may further include an image registering processor coupled to the first, second and third cameras to receive the images captured thereby and adapted to register the images captured by the second and third cameras on to the images captured by the first camera, synchronously, using a first neural network, and a detector coupled to the first, second and third cameras to receive synchronously the images captured thereby and adapted to identify one or more of the other land vehicles captured on the images captured by the first, second, and third cameras using a second neural network, wherein output from the second neural network include a confidence level for each of the identified other land vehicles and classification information for classifying a subset of the identified other land vehicles into a first class. The apparatus may further include an exception generator coupled to the detector to receive the classification information and the confidence level and adapted to generate an exception signal when at least one of a) the confidence level is below a first determined level and b) a number of the identified other land vehicles in the first class exceeds a second predetermined number. In some embodiments of the present invention, the second predetermined number is one. The detector is further adapted to classify the identified other vehicle is classified as the second class if the identified other vehicle is being driven manually. In some embodiments of the present invention, the first camera is a LIDAR and the second and third cameras are optical digital cameras, and the first neural network is a convolutional neural network and the second neural network is a recursive neural network. The apparatus may further include an alarm generator coupled to the exception generator and adapted to produce a human perceptive notice when the exception signal is received. In some embodiments of the present invention, the detector is further adapted to produce the confidence level to be below the first determined level when a vehicle is identified in the registered one of the second and third cameras and no vehicle is identified in the corresponding location in the registered image from the first camera.

Various embodiments of the present invention apparatus may further include an image rendering processor coupled to the image registering processor, coupled to the first, second, third cameras to receive the images captured thereby and adapted to generate a combined image, wherein the combined image has the image captured by the first camera as a background image and the images from the second and third cameras are inserted into corresponding registered locations in the background image, and a display screen coupled to the image rendering processor and the exception generator and adapted to display the combined image when the exception signal is received. In some embodiments, the display screen is remotely located from the autonomous land vehicle or a three-dimensional screen having one graphical representation for the first class vehicles and a different graphical representation for the second class vehicles. In certain embodiments the apparatus may also include a third neural network adapted to receive substantially identical inputs and generate substantially identical outputs the first neural network; and a fourth neural network adapted to receive substantially identical inputs and generate substantially identical outputs of the second neural network, wherein the first and second neural networks are executed on a first virtual machine and the third and fourth neural networks are executed on a second virtual machine, and a security processor coupled to the first and second neural networks and adapted to detect an attempt to alter the first and second neural networks by an unauthorized source, wherein a security alarm signal is generated when an attempt to alter is detected, and wherein the exception generator is further coupled to the third and fourth neural networks and to receive the classification information and the confidence level therefrom upon the generation of the security alarm.

Certain embodiments include a method of controlling an autonomous land vehicle moving in traffic with other land vehicles. The method may include the step of registering images captured by a second camera and a third camera on to the images captured by a first camera, synchronously, using a first neural network, wherein the first camera is mounted on the autonomous land vehicle and located to capture image with a wide angle view that includes a front view and at least one side view, a second camera is mounted on a front side of the autonomous land vehicle and located to capture images with a view from the front side of the autonomous land vehicle, and a third camera is mounted on the at least one side of the autonomous land vehicle to capture images from the at least one side of the autonomous land vehicle. Some embodiments may also include the steps of identifying one or more of the other land vehicles captured on the images captured by the first, second, and third cameras using a second neural network, wherein output from the second neural network include a confidence level for each of the identified other land vehicles and classification information for classifying a subset of the identified other land vehicles into a first class; and generating an exception signal when at least one of a) the confidence level is below a first determined level and b) a number of the identified other land vehicles in the first class exceeds a second predetermined number. The method may include the steps of determining if other vehicle is being driven manually or autonomously, generating an alarm when the exception signal is received, and producing the confidence level to be below the first determined level when a vehicle is identified in the registered one of the second and third cameras and no vehicle is identified in the corresponding location in the registered image from the first camera. Some embodiments may also include the steps of generating a combined image, wherein the combined image has the image captured by the first camera as a background image and the images from the second and third cameras are inserted into corresponding registered locations in the background image; and displaying the combined image when the exception signal is received; and instantiating on a first virtual machine a third neural network adapted to receive substantially identical inputs and generate substantially identical outputs the first neural network and a fourth neural network adapted to receive substantially identical inputs and generate substantially identical outputs of the second neural network, and instantiating the first and second neural networks on a second virtual machine.

Various embodiments of the invention may relate to an autonomous machine or system. The autonomous machine may include a first subordinate neural network having a structure that includes an input layer, an output layer, and at least two hidden layers. The first subordinate neural network may be configured to receive input data and to generate output data. An aspect of the autonomous machine is operated by using one or more of the output data. For instance, output data may be an output signal controlling the temperature of a refrigerator (or other appliance) or a vehicle (manned or unmanned). The autonomous machine also includes a machine controller coupled to the first subordinate neural network and includes (i) a first processor configured to detect a first triggering event, and (ii) a neural network controller coupled to the first processor configured to re-train the first subordinate neural network when the first processor detects the first triggering event. The machine controller may further include a second processor configured to receive and select said input data and the output data, and a memory unit configured to store and retrieve the selected input data and the selected output data, wherein the neural network controller is further configured to use said selected input data and said selected output data in re-training said subordinate neural network.

Some exemplary embodiments of the autonomous machine also include a second subordinate neural network having a structure substantially similar to said structure of said first subordinate neural network; said machine controller further coupled to said second subordinate neural network; and said neural network controller further configured to replace said first neural network with said second neural network when said first processor detects said first triggering event during the operation of the autonomous machine.

In another exemplary embodiment of the autonomous machine, said first processor is further configured to detect a second triggering event and said neural network controller is further configured to take an action different from the action taken when the first triggering event took place.

Moreover, in some exemplary embodiments of the autonomous machine, the first processor is unmodifiable after an initial setup or installation on to the autonomous machine. In some exemplary aspects, the first processor can be a neural network being trained on to recognize said triggering event.

In some embodiments, the subordinate neural networks are continually trained periodically in time and/or can be trained on stored input/output data set that have been sampled from the input data and output data. In some embodiments, the sampling can be based on statistical analysis and/or based on normal operation without detecting a triggering event or based on an affirmed successful operation of a task.

In certain embodiments, a method of operating an apparatus using a control system that includes at least one neural network is provided. The method includes the steps of: receiving organized input data (referred to as an input vector) captured by the operating apparatus, processing the input vector using the at least one neural network of the control system, obtaining an output from the at least one neural network resulting from processing the input vector, comparing the output from the at least one neural network with a predetermined range, and using the obtained output from the at least one neural network in controlling the operating apparatus if the output from the at least one neural network is determined to be within the predetermined range (e.g., the output does not breach the predetermined range).

The method may further include the step(s) of defining the predetermined range with a set of machine recognizable human speech portions and/or processing the output from the at least one neural network with another neural network to determine whether the output is within the predetermined range or not. The method can also include the step of determining the predetermined range to be a safe operating range using another neural network, and/or determining the predetermined range to prevent damage to the operating apparatus.

Some embodiments of the present invention may include an apparatus being operated in part by a controller. Such an apparatus may include an input device coupled to the apparatus and constructed to generate an input vector, at least one neural network coupled to the controller and constructed to receive the input vector and to generate an output, and a comparator constructed to compare the output from the at least the at least one neural network with a predetermined range, wherein the controller is further constructed to operate the apparatus using the output of the comparator determines the output from the al least one neural network is within the predetermined range (e.g., the output does not breach the predetermined range). The input device may include at least one of a digital camera, a microphone, and a thermometer.

One innovation includes an apparatus having a plurality of components, the apparatus including an input device constructed to generate an input data vector, a first neural network structured and trained to generate an output by processing an input data vector received from the input device, a first processor configured to receive the output from the first neural network and coupled to one of the components of the apparatus, the first processor further configured to control an operation of the one of the components of the apparatus using the output from the first neural network, a second neural network configured to receive the output from the first neural network, the second neural network structured and trained to generate a control output from the output of the first neural network. The configuration of the processor to implement the functionality disclosed herein may refer to a hardware structure configuration, a software that configures the processor, or a combination of its hardware structure and software. The apparatus further may include a second processor configured to receive the control output from the second neural network, and manage an instance of the first neural network using the control output from the second neural network. Such an apparatus may include other various aspects or features. In some embodiments, the second neural network is further structured to determine whether the output of the first neural network corresponds to a predetermined condition. In some embodiments, the second processor is further constructed to terminate operation of the first neural network when the second neural network determines the output of the first neural network corresponds to the predetermined condition. In some embodiments, the second processor is further configured to re-train the first neural network when the second neural network determines the output of the first neural network corresponds to the predetermined condition. The second processor may be further configured to further to re-train the first neural network using the input data vector generated by the input device.

In some embodiments, an apparatus may further include a third neural network configured to provide a second output to the second neural network, the third neural network structured and trained substantially identical to the first neural network to generate the second output by processing the input data vector, where the second neural network is further trained to compare the output from the first neural network and the second output from the third neural network, and detect a difference between the output from the first neural network and the second output from the third neural network. In some embodiments, the second processor is further configured to perform a control action if the detected difference corresponds to a predetermined level. In some embodiments, the second processor is further configured to terminate the operation of the first neural network if the detected difference is above the predetermined level. In some embodiments, the second processor is further configured to re-train the first neural network if the detected difference is above the predetermined level. In some embodiments of the apparatus, the apparatus is an autonomous land vehicle and the step of using the obtained output further includes the step of generating a message to control the autonomous land vehicle.

Another innovation includes a computer-implemented method of controlling an apparatus, the method including processing an input data vector using a first neural network structured and trained to generate an output by inferencing on the input data vector, controlling an operation of an aspect of the apparatus using the output from the first neural network, generating a control output using a second neural network structured to and trained to generate the control output by inferencing on the output generated by the first neural network, and controlling an operation of the first neural network using the control output from the second neural network. Such methods may be performed by one or more computer hardware processors configured to execute computer-executable instructions on a non-transitory computer storage medium.

In some embodiments, the method further includes determining whether the output of the first neural network corresponds to a predetermined condition, and in response to determining that the output corresponds to the predetermined condition, performing an action affecting the operation of the first neural network. In some embodiments, the method may further include terminating the first neural network when the output is determined to correspond to the predetermined condition. In some embodiments, the method may further include re-training the first neural network when the output is determined to correspond to the predetermined condition.

In some embodiments, the method may further include generating a human recognizable notification in response to determining the output corresponds to the predetermined condition. In some embodiments, the method may further include defining the predetermined condition to be a condition that prevents damage to the apparatus. In some embodiments, the method further includes receiving, from a machine recognizable human speech part, information identifying the predetermined condition, and defining the predetermined condition based at least in part on the information received from the machine recognizable human speech part. In some embodiments, the apparatus is a human speech generator comprising a loudspeaker, and controlling the operation using the output includes generating human speech parts to be played on the loudspeaker. In some embodiments, the apparatus is an autonomous land vehicle, and controlling the operation using the output includes generating a signal to control an autonomous land vehicle based at least in part on the output. In some embodiments, the apparatus comprises an image generator.

Another innovation includes an apparatus having a plurality of components, the apparatus including an input device constructed to generate an input data vector, a first neural network structured and trained to generate an output by processing an input data vector from the input device, a first processor configured to receive the output from the first neural network and coupled to one of the components of the apparatus, the first processor further configured to control an operation of the one of the components of the apparatus using the output from the first neural network, a second neural network configured to receive the coupled to receive the output from the first neural network, the second neural network structured and trained to generate a control output and to determine whether the output corresponds to a predetermined condition, and a second processor configured to receive the control output from the second neural network, the second processor configured to control an operation of the first neural network using the control output from the second neural network. In some embodiments, the second processor is further configured to terminate the first neural network when the second neural network determines the output from the first neural network corresponds to the predetermined condition.

In certain embodiments, a method of operating an apparatus using a control system that includes at least one neural network is provided. The method may include steps of controlling the operation of the at least one neural network by using another neural network with defined boundary conditions.

In certain aspects, the prior art neural network's inability to generalize results to properly predict on closely aligned classes is the basis for some exemplary embodiments the present invention. Various embodiments may include, for example: (1) providing a controller to monitor one or more implementation Neural Network (ImNN), this is another way of referring to the subordinate neural network; the controller may be configured for starting and stopping one or multiple ImNNs; (2) providing a re-parameterization and subsequent re-training of a particular ImNN when one or more triggering events (e.g., incorrect results) generated by one or more of the ImNN; and (3) re-parameterization and subsequent re-training may include the following: re-training on stored and/or updated ImNN reference data and labels, re-parameterization based on stored ImNN reference configurations, and/or shutting down the autonomous machine. Various of embodiments of the present invention also relates to autonomous machine capable of self-correction, and autonomous land vehicle capable of determining the timing of transition to manual control from automated driving.

DETAILED DESCRIPTION OF CERTAIN INVENTIVE ASPECTS

The detailed description of various exemplary embodiments below, in relation to the drawings, is intended as a description of various aspects of the various exemplary embodiments of the present invention and is not intended to represent the only aspects in which the various exemplary embodiments described herein may be practiced. The detailed description includes specific details for the purpose of providing a thorough understanding of the various exemplary embodiments of the present invention. However, it will be apparent to those skilled in the art that some aspects of the various exemplary embodiments of the present invention may be practiced without these specific details. In some instances, well-known structures and components are shown in block diagram form in order to avoid obscuring various examples of various embodiments.

Although particular aspects various exemplary embodiments are described herein, numerous variations, combinations and permutations of these aspects fall within the scope of the disclosure. Although some benefits and advantages of certain aspects are mentioned, the scope of the disclosure is not intended to be limited to particular benefits, uses or objectives.

1. Neural Networks

Some aspects of various exemplary embodiments are described by referring to and/or using neural network(s). Various structural elements of neural network includes layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. The value of each of the connection is multiplied (or other mathematical operation) by its respective connection weight. The resulting values are all added together (or other mathematical operation). A bias (e.g., nodal value) can also be added (or other mathematical operation). A bias is sometimes constant (often −1 or 1) and sometimes variable. This resulting value is the value of the node when activated. Another type of nodes is convolutional nodes, which are similar to aforementioned nodal characteristics, are typically connected to only a few nodes from a previous layer, particularly adapted to decode spatial information in images/speech data. Deconvolutional nodes are opposite to convolutional nodes. That is, deconvolutional nodes tend to decode spatial information by being locally connected to a next layer. Other types of nodes include pooling and interpolating nodes, mean and standard deviation nodes to represent probability distributions, recurrent nodes (each with connections other nodes and a memory to store the previous value of itself), long short term memory (LSTM) nodes that may address rapid information loss occurring in recurrent nodes, and gated recurrent units nodes that are a variation of LSTM node by using two gates: update and reset.

A neural network can be a feedforward network that includes multi-level hidden layers with each layer having one or more nodes. In some exemplary embodiments of the present invention, a neural network can be a recurrent neural network either forward moving only in time or bi-directional as including forward moving components and backward moving components. Some exemplary aspects of the present invention contemplate using a recursive neural network that can configure itself adoptively with different number of layers with different number of nodes for each layer depending on given training data. In some embodiments of the present invention, the recursive neural network is a configuration of a neural network created by applying the same set of weights recursively over a structured input (producing a structured prediction over variable-size input structures) or a scalar prediction on it by traversing a given structure in topological order.

In some aspects, various exemplary embodiments contemplate taking advantage of the nonlinearity of a neural network, which may cause loss functions to become non-convex. In other words, neural networks are typically trained by using training data set on iterative, gradient-based optimizers that would drive the cost function to a very low value. In some exemplary aspects of the present invention, when training data set can be preprocessed to develop characteristic by large linear regression, support vector machines with gradient descent can be used to train a neural network.

For computing the gradient (e.g., in feed-forward neural networks), in some exemplary embodiments contemplate using back-propagation, while another method such as stochastic gradient descent can be used to perform learning using this gradient. In some aspects of the present invention, the back-propagation can also be applicable to other machine learning tasks that involve computing other derivatives, e.g., part of the learning process, or to analyze the learned model.

In some exemplary embodiments, neural networks may undergo regularization (and, optionally, optimization for neural network training) during a training session using training data set. In some aspects of the present invention, regularization contemplates to be modification to the neural network to reduce its generalization error. The optimization, in some exemplary embodiments, can use continuation methods. This option can make optimization more efficient by selecting initial points causing the local optimization efforts in well-behaved regions of training data set space. In another exemplary embodiment, the optimization can use a stochastic curriculum, e.g., gradually increasing the average proportion of the more difficult examples is gradually increased, whereas in a conventional training a random mix of easy and difficult examples is presented to neural nets to be trained.

In some exemplary embodiments, supervised training or unsupervised training (or combination thereof) can be employed to train a given neural network. The unsupervised training allows a neural network to discern the input distribution/pattern on its own. In some exemplary embodiments of the unsupervised training, each layer of a neural network can be trained individually unsupervised, and then the entire network is trained to fine tune.

In some exemplary aspects of present invention, the input data are sampled so that the neural network can be more efficiently trained. In this example embodiment, sampling can be performed by using statistical methods to approximate the input distribution/pattern such as Gibbs sampling. The Gibbs sampling is an example approach in building a Markov chain, which is an example method to perform Monte Carlo estimates.

The above described various types of nodes are used in a number of different neural network structures, such as the feedforward neural network described in connection with FIG. 1. Other neural network structures includes: a Hopfield network, a network where every neuron is connected to every other neuron; a Boltzmann machines, which is similar to the Hopfield network but with some nodes used as input/output nodes and others remain hidden nodes; and a Restricted Boltzmann machine. These three neural network structures can include Markov chains used as preprocessors.

Another set of neural network structures includes: deep convolutional neural networks and deconvolutional networks, which use the convolutional and deconvolutional nodes described above. The convolutional/deconvolutional networks can be combined with feedforward neural networks. For instance, generative adversarial networks can be formed by two different neural networks such as a combination of a feedforward neural network and convolutional neural network, with one trained to generate content related information (e.g., feature extraction) from input data and the other trained to use the content related information to determine the content (e.g., identifying objects in images).

Another group of neural network structures includes: recurrent neural networks that use the recurrent nodes described above, LSTM use the LSTM the aforementioned LSTM nodes, gated recurrent units having an update gate instead of other gate of LSTM, neural Turing machines that have memories separated from nodes, bidirectional recurrent neural networks, and echo state networks having random connections between recurrent nodes.

Yet another group of neural network structures includes: deep residual networks which is a deep feedforward neural networks with extra connections passing input from one layer to a later layer (often 2 to 5 layers) as well as the next layer, extreme learning machines that is a feedforward neural network with random connections but not recurrent or spiking. Regarding a spiking neural network, liquid state machines are similar to extreme learning machines with spiking nodes, such as replacing sigmoid activations with threshold functions and each node has a memory capable of accumulating.

Other structures include: support vector machines that finds optimal solutions for classification problems, self-organizing neural networks such as Kohonen neural networks. Another set of neural network structures includes: autoencoders configured to automatically encode information, sparse autoencoders that encodes information in more space, variational autoencoders with are pre-injected with an approximated probability distribution of the input training samples, denoising autoencoders that trains with the input data with noise, and deep belief networks are stacked structures of autoencoders. The deep belief networks have been shown to be effectively trainable stack by stack.

In some embodiments, the neural network may include a neural network that has a class of deep, feed-forward artificial neural networks that use a variation of multilayer perceptrons designed to require minimal preprocessing and may also use hidden layers that are convolutional layers (or CNN), pooling layers, fully/partially connected layers and normalization layers. Some embodiments can be referred to as shift invariant or space invariant artificial neural networks (SIANN), based on their shared-weights architecture and translation invariance characteristics. A neural network may self-train (e.g., Alphago Zero) such as by using re-enforcement learning. Variations on this embodiment include the deep Q-network (DQN) which is a type of deep learning model that combines a deep CNN with Q-learning, a form of reinforcement learning. Unlike earlier reinforcement learning agents, DQNs can learn directly from high-dimensional sensory inputs. Variation on this embodiment include convolutional deep belief networks (CDBN) which have structure very similar to the CNN and are trained similarly to deep belief networks. These extensions exploit the 2D structure of images, like CNNs do, and make use of pre-training like deep belief networks. Further variations on this embodiment include time delay neural networks (TDNN) which allow timed signals (e.g. speech) to be processed time-invariantly, analogous to the translation invariance offered by CNNs. The tiling of neuron outputs can cover timed stages. It should be noted that the above-mentioned neural networks can be trained using training data sets using the unsupervised learning, the supervised learning, or the reinforcement learning steps.

2. Boundary Conditions

FIG. 3a graphically illustrates a simplified decision-making space 301 that shows both the input data space and output results from neural networks. In particular, outer polygonal boundary 303 may depict the entire input sample space (e.g., the decision-making space) in two dimensions, and two smaller circles, 305 and 307, located therein may depict validated output classes. A neural network can be structured and trained using sample input data, either supervised or unsupervised, to classify input data into output categories. Here, structuring a neural network includes selecting an appropriate neural network structure (e.g., CNN) and providing an adequate number of nodes and layers of nodes for the given classification goal. In one example embodiment, the sample space may represent two features from a set of images, the polygon 303 representing the entire range in which values of those two features can take for the sample images. Continuing with the example, one class 305 can be images that have pictures of cats, and the other class 307 can be images that have pictures of dogs. Here, a neural network can be structured and trained using training sample images to inference (e.g., classify) whether an image contains a picture of a cat, a dog, both, or neither.

In some embodiments of the present invention, boundary conditions are introduced in operating/controlling neural networks. In connection with FIG. 3b, a set of boundary conditions can be described as allowing the output of a neural network to be only within a certain range—e.g., Region A 351, although the input data can be anywhere within the entire sample space as depicted in FIG. 3a. Referring back to FIG. 3b, if an output from a neural network structured and trained to inference classes located within Region A, the output can be used in a subsequent processing, described below in connection with various embodiments of apex controllers. The expression "apex" in "apex controller" is used for the ease of reference and to connote that an apex controller executes a neural network (or an Implementation Neural Network described below.) However, if output of such a neural network is outside of Region A (e.g., Region B 353 or Region C 355 of FIG. 3b), the output can be discarded and not used. In another simplified depiction of FIG. 4, the decision-making can be illustrated as a function in a one-dimensional space. In this simplified version, the boundary conditions are depicted as a range 401 in which an output from a neural network is checked against.

The above-mentioned boundary condition is further described in terms of operational environments. More specifically, an autonomous machine may include input devices and a controller that has a neural network. In this example embodiment, the controller is configured to control various aspects of the autonomous machine by processing input data from the input devices and output from the neural network, among other information and processing steps. More specifically, in connection with FIG. 5, the processing steps may include feeding input data (or sometimes referred to as input vector) 501 to a neural network 503 structured and trained to inference using the input data to produce an output. This is followed by the step of determining whether the output breaches any of the boundary conditions 505. If "no," the output is forwarded to the next step 507 by the controller, described below in connection with various embodiments of apex controllers. If "yes," the output is not forwarded to the next step to be further processed 509.

In describing a exemplary embodiment with more possible courses of action when the answer is "yes," FIG. 6 illustrates the steps of feeding input data (or sometimes referred to as input vector) 601 to a neural network 603 structured and trained to inference on the input data to produce an output. This is followed by the step of determining whether the output breaches any of the boundary conditions 605. If "no," the output is forwarded to the next step 607. If "yes," a determination is made on the severity of the breach 609. After such a determination is made, other step(s) can be taken by the controller, such as shutting down 611 the machine, the controller or the neural network, re-training the neural network 613, not forwarding the output to the next step 615, and/or not taking any action but discarding the output.

The step of determining the severity of breaching the boundary conditions can be illustrated in connection with FIG. 3b. That is, in some embodiments of the present invention, multiple sets of boundary conditions can be imposed. In the example embodiment of shown in FIG. 3b, three regions are shown. The first region is referred to as Region A 351, in which the output from a neural network would have been forwarded to the next step in the processing chain. Output falling within Region A 351 is considered as not breaching the boundary conditions and/or satisfying the boundary conditions. The second region is referred to as Region B 353, in which the output could be considered as breaching (e.g., violating or exceeding) the boundary conditions but not harmful to the machine or anyone/anything surrounding the machine. In this case, the output can be ignored/discarded and not forwarded to the next step in the processing step. The third region is referred to as Region C 355, in which the output breaches the boundary conditions to such an extent that it could cause harm to the machine or to someone/something surrounding the machine. In such a case, the machine is shut down immediately or the controller notifies the user that the machine needs to be used in its manual mode.

In an exemplary embodiment, the above-described features of the present invention can be implemented on various automated machines such as an appliance (e.g., an oven), a speech generator, an autonomous vehicle, a robot, and etc. Providing a particular exemplary embodiment, an oven, with various features of the present invention, may include an input device and a controller. The input device may include a temperature probe configured to be inserted into the food material in the oven, thermometer(s) to sense the ambient temperature inside the oven. The controller is coupled to the input devices to collect the temperature information from the various thermometers. The controller may also include an implementation neural network (ImNN) that has been structured and trained to receive the collected temperature information and process the information to generate an output by inference. The output can be used by the controller to manage the temperature of heating devices that provides heat to the oven. In various embodiments of the present invention, the controller can be configured to turn on/off, lower or raise the temperature of the heating devices. In this exemplary oven embodiment, the controller may also include a processor to receive the output from the implementation neural network. The processor can be configured to determine if the output is within the predetermined range (e.g., the range being set to ensure the oven does not overheat). The predetermined temperature range operates as boundary conditions described above.

In another exemplary embodiment, a speech generator can be equipped with various features of the present invention. In particular, an exemplary speech generator of the present invention may include an implementation neural network structured and trained to generate signals/data that can become human understandable phrases, sentences, and etc. when played on a loudspeaker. The operation of the implementation neural network (ImNN) can be controlled/managed/manipulated by a controller that includes another neural network (for the ease of reference, this neural network is called an apex Neural Network, "apex NN"). The apex NN is structured and trained to receive speech parts from a speech generator and to process the speech parts to determine if the received speech parts fall within the boundary ranges. More specifically, the apex NN can be trained with particular set of forbidden words (such as curse words, racially/sexually derogative words, and etc.) to be used as boundary conditions. That is, when the ImNN of the speech generator outputs one of forbidden words, the apex NN recognizes it as a forbidden word, and does not forward the output of the speech generator to a loudspeaker.

In some embodiments, a database may only store and later retrieve input-output combinations having outputs that do not breach boundary conditions. In these embodiments, re-training ImNN can be more efficiently conducted because the new "training" data set is within the boundary conditions.

Although boundary conditions have been illustrated in connection with one-dimensional decision space, two-dimensional decision space, oven control and speech generation contexts, the use of boundary conditions can be also expressed in terms of triggering events (that is a triggering event being a form of a boundary condition), in terms of hard operating limitations of the machine being controlled, and/or in terms of using confidence levels of the outputs of neural networks. In addition to expressing boundary conditions as triggering events, boundary conditions can also be viewed as expressions of the competence range in which a given neural network is structured and trained to operate. Also a different way to define boundary conditions can be in term of the confidence level in connection with a given output from a neural network. That is, if the confidence level of an output of a neural network falls below a predetermined level (e.g., below 60%), such an output can be discarded. These examples of technological applications are further described in detail below in connection with various embodiments.

3. Run-Time Control Engines that Includes One or More Implementation Neural Networks In various exemplary embodiments, an optimal system of neural network(s) is developed by selecting a structure, and trained at a central location (e.g., manufacturing facility, factory, research and development center, central processing facility such as where cloud processing and storages are located and/or etc.) using training data collected from a variety of sources and users. Such a training data set can be referred to as a global data set. Once the optimal system of neural network(s) is developed and trained for a given industrial/technological application using a global data set, it can be deployed on to an autonomous machine to operate the machine. "Autonomous machine" as used herein refers to autonomous machine such as an autonomous land vehicle (some may refer to it as a driverless car), a robot, a refrigerator with automated controller (e.g., Internet of Things, "IoT," controller), an automated personal assistant (e.g., Alexa by Amazon, Inc., Siri by Apple, Inc.), and other similar devices, with minimal manual control, if any. A deployed control system on an autonomous machine can be referred to as a run-time control engine. Although a run-time control engine is described below in connection with a deployed control system, such a run-time control engine can also be used at the above-mentioned central location or a different central location (e.g., manufacturing facility, factory, research and development center, central processing facility such as where cloud processing and storages are located and/or etc.).

Figure 7:
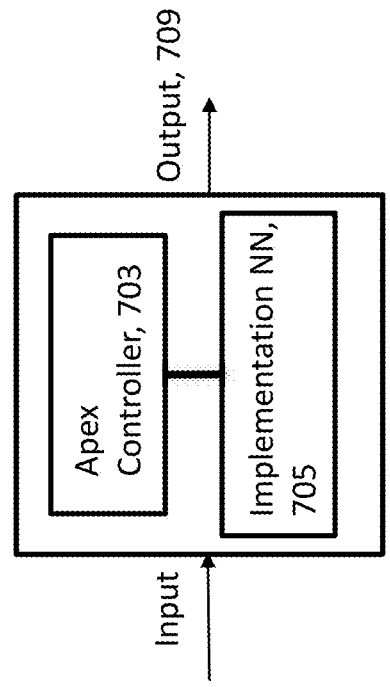
FIG. 7 is a block diagram illustrating a embodiment of a run-time engine that includes an apex controller and one implementation neural network ("ImNN")

In various embodiments, a run-time engine 701 includes: an apex controller 703 and an implementation neural network 705, as illustrated in FIG. 7. Various embodiments of the apex controller are described herein in reference to the Figures. In some embodiments, a common characteristic of the various embodiments of the apex controller is that it is deployed to an autonomous machine and is operatively connected to one or more ImNNs also deployed to the autonomous machine. More specifically, the one or more ImNNs can be instantiated and/or initialized to run at the time of deployment or can be instantiated and/or initialized by the deployed apex controller subsequent to the deployment. The apex controller is configured to control, adjust, and/or otherwise manipulate the connected ImNNs. That is, in certain examples the apex controller is implemented to execute (e.g., control/manage/manipulate) one or more implementation neural networks ("ImNN")—in part using boundary conditions. The expression "apex" in "apex controller" is used for the ease of reference and to connote that an apex controller executes ImNN(s).

Various embodiments of neural networks that can be used as ImNNs have been described above in Section 1. In various embodiments of the present invention, some aspects of the apex controller can be implemented by using one or more neural networks as well, which have been describe above in Section 1, to control, manage, or manipulate the ImNNs or in combination with computer implemented logic such as a set of algorithms and/or heuristics based logical steps. Here, an algorithm refers to a set of computer-implemented procedures or steps in solving a given problem or achieving a goal, which can be referred to as logical deductive reasoning implemented on a computer processor. Heuristics can be described as deductive reasoning as well but viewed as providing approximate solutions. A neural network is considered as performing inference after being trained. An ImNN being executed (e.g., controlled/managed/manipulated) by an apex controller that has boundary conditions generated by an algorithm can be viewed as an inference mechanism being controlled by a deductive mechanism: whereas, if an apex controller has a neural network (trained on boundary conditions) in executing (e.g., controlling/managing/manipulating) an ImNN can be described as an inference mechanism controlling another inference mechanism.

It should be noted that when an ImNN or a neural network is called out, a selected structure (one or a combination of various structure described in Section 1 or known in the art) is trained using a train data set. The resulting trained neural network would be optimized to conduct a task designed to perform. In FIG. 7, the apex controller 703 is connected to the ImNN 705 via a line to depict that the apex controller executes 703 (e.g., controls/manages/manipulates) the ImNN 705.

In some exemplary embodiments, an apex controller (be it implemented based on computer logic, neural network(s) or a combination thereof) is not modifiable once deployed onto an autonomous machine. Such apex controller can be implemented on a chip, ASIC, and/or firmware. This is, for example, to prevent a potential security breach (e.g., a virus attack) and/or to provide a baseline from which to re-boot or re-organize the ImNN after a triggering event (e.g., a security breaching type of triggering event) is detected. In other words, in some exemplary embodiments, the logic and/or neural network(s) located in the apex controller is not modifiable or adjustable by or at the autonomous machine, but only re-deployable, modifiable, and/or adjustable by an authorized system of the original manufacturer of the autonomous machine—while the ImNNs can be continuously trained on the affected (also referred to as the subject) autonomous machine including being re-trained with new data collected by the machine, as described herein. It should be noted in other embodiments, such an apex controller can run on one thread (e.g., on one virtual machine), while ImNN(s) can run on another thread (e.g., another virtual machine) on a general-purpose processor or a graphical accelerator/processor, a processor specifically adapted to allow efficient running of neural networks also referred to as neural network processors. The ImNN(s) can also run on a processor (e.g., a general-purpose processor, or graphical accelerator/processor, digital processor or processors specifically adapted to allow efficient running of neural networks also referred to as neural network processors).

In a conventional system, neural networks deployed to autonomous machines are trained by training data set collected globally. That is, data collected from numerous autonomous machines (and some collected from other sources) are lumped together to form the universe of data samples to be used for training neural networks, after which trained neural networks are deployed to autonomous machines. In such a system, a new training data set is also collected globally for re-training neural networks, which are then re-deployed to the previously deployed autonomous machines. That is, the decision for re-training/manipulation/ nodal value adjustments and performing such as tasks are decided and performed at the global level (e.g., manufacturing facility, factory, research and development center, central processing facility such as where cloud processing and storages are located and/or etc.) Such systems present a number of potential shortcomings: i) autonomous machines cannot adopt to the local conditions since the training data sets are collected globally, ii) the privacies of the users can be violated, if data are gathered by autonomous machines while being used by the users and collected to form a global training data set, iii) the deployed neural networks cannot be re-trained immediately when faced with a new situation but must wait until the set of global training data set becomes available, and/or iv) more prone to virus attacks since such neural network need to be updated remotely.

In various embodiments, the decision for re-training, manipulation, and/or nodal value adjustments and performing such as tasks can be completed at the local (i.e., on the autonomous machine) level. In certain implementations, this method is referred to as the on-device training. The decision to re-train, manipulate, and/or adjust nodal values can be determined by a triggering event detector and apex controller as described below in Section 3.b.

In some embodiments, the ImNN is re-trained using both the globally collected training data set (sometimes referred to as the foundation data set) and new training data set collected by the subject autonomous machine (i.e., the autonomous machine on which ImNN is deployed or instantiated by an apex controller deployed on the machine). Here, the training data set collected by or at the autonomous machine is referred to as new training data set. In some embodiments, the ImNN is re-trained incrementally, which can refer to either re-training using the new training data set or re-training using the foundation data set as well as new training data sets. In some embodiments, the incremental training data set can also be: a single sample with many distributive noise samples around the single sample, multi-samples with distributive noise samples around the multi-sample set, or a collection of samples gathered over time by the subject autonomous machine. The step of incremental training can use the initial, previous iterations of, and/or current nodal values of the ImNN as the baseline. In other words, the ImNN can be incrementally re-trained in a variety of ways, for example, using the new training data set, using the new training data set on the previous nodal values, or by re-training the entire network from scratch using the foundation training set and new training data set.

3.a. Various Types of Input/Output Data/Signal

Referring back to FIG. 7, the exemplary embodiment includes input data/signal ("input") 707 and output data/signal ("output") 709 connected to the apex controller 703 and the ImNN 705. In some embodiments of the present invention, the input data and/or the output data may be a voltage or a current, real-valued or complex-valued. In some embodiments of the present invention, the input data and/or output data can be data, signal(s) or other information. In one exemplary embodiment, the input is a vector input of human speech after being digitally sampled. In another exemplary embodiment, the input is a vector of pixel values of in a sequence of images. In another exemplary embodiment, the input is a set of signals from various sensors (e.g., output of one or more sensors such as a thermometer, pressure sensor, compass, altimeter, gyroscope, accelerometer, image sensor, radiation sensor, audio/sound sensor, e.g., a microphone, and/or other types of sensors). In another exemplary embodiment, the input is signals/data from a combination of sensors to operate/control a particular machine (e.g., autonomous land vehicles, robots, personal assistant, refrigerators, washers, or other types). In some example embodiments, input can be a combination of the above example input types. In some embodiments of the present invention, there can be a one-to-one relationship between input data and output data. That is, one input vector causes one output vector to be generated. In some other embodiments, there can be many-to-one or one-to-many or many-to-many input and output data relationships.

In one exemplary embodiment, the output of the run-time control engine can be a control signal to start or stop a compressor (e.g., in a refrigerator). In another exemplary embodiment, output can be one or more control signals to steer one or more wheels, accelerate or decelerate the autonomous machine, or stop to control automatically an autonomous vehicle. In another exemplary embodiment, output can be one or more control signals to control the movement of a robot by controlling motors (e.g., electrical, hydraulic, etc.). In another exemplary embodiment, output can be one or more control signal/data in generating human understandable speech. In other words, the output(s) from ImNN(s) is/are used in subsequent steps in controlling autonomous machines.

Certain exemplary embodiments contemplate other categories input and output signals/data/information in various industrial/technological usages, and the use of interface devices to convert raw signals/data/information into input signals/data/information for the ImNN or computer implemented logic of the run-time control engine.

3.b. Triggering Event Detector and Actions by Apex Controller

In various exemplary embodiments, an apex controller includes a triggering event detector. As noted above, a triggering event is a form of a boundary condition. As such, a trigger event detector is an example of mechanism(s) in detecting/sensing boundary conditions. In some embodiments, the triggering event detector is implemented using a neural network that is structured and trained to detect one or more of triggering events or a type of events. In other embodiments of the present invention, a set of logical steps in algorithms/heuristics can be used to detect one or more triggering events or a type of events. In yet some embodiments, a trigger event detector is a combination of a neural network and a set of logical steps. Exemplary embodiments contemplate, triggering event as:

Incorrect/abnormal type: Output(s) being out of operating bounds/limitations—examples:
- In a refrigerator controller, the controller attempts to raise the temperature of fridge above the recommended operational temperature
- In an oven the controller attempts to raise the temperature above a recommended operational temperature
- In an oven and/or stove, turn on the oven and/or stove during a time or condition when it has been designated for non-use (for example, between 1 am and 6 am, or when no one is at home, e.g., when a sensor determines that no one is home)
- In a speech generator, curse words or other inappropriate words are generated
- In a controller for a driverless car, the controller issues a lane change command after receiving a proximity warning
- In an image generator, inappropriate images are generated
- In an image display apparatus, inappropriate images are displayed
- In a controller for a robot, a command to harm a human being is created
- In a printer controller, a counterfeit currency or counterfeit signature is generated Security Breach Type:
- In a controller for a refrigerator (or another system for example a video camera system) repeated information requests to particular websites
- An authorized access to personal information
- An attempt to adjust or replace or otherwise modify the controller
- An attempt to cause a denial of service attack on a remote device
- While running two virtual machines on an autonomous machine with substantially identical ImNNs on each virtual machine, one set of ImNNs start generating output data deviating from the output of the other set of ImNNs Unauthorized usage level type: In an automated personal assistant embodiment, when a user is assigned to a G-rated search results only, the personal assistant generates results that are in R-rated category.

Changing Modes Type (e.g., from an Automated Mode to a Manual Mode):
- In an autonomous land vehicle, an automated detection system configured to detect surrounding vehicles identifies a nearby vehicle with a low confidence level
- In an autonomous land vehicle, detecting weather condition and whether or not a night vision cameras needs to be on.

Adapting to User:
In an autonomous personal assistant, when a user gives an instructional command (e.g., "look for a book written by . . . ") and the command is carried out successfully, the command and the resulting operation(s) by the personal assistant can form a set of training data. This set of successful input-output combination can be stored in and retrieved from a database management system. The user can also issue a confirming command (e.g., "a good job"). Subsequently, after a certain time, a command to the personal assistant with a selected command (e.g., "update"), or a triggering event can cause to re-train the ImNN using the stored and then retrieved input-output combinations. [Here, the example boundary conditions are the time constraint, the selected command, and other triggering events, e.g., virus attack or the personal assistant learning and speaking prohibited words/phrases.] This would train the personal assistant to adopt the user's personal choices and/or accents, if any. In some embodiments, a reinforcement learning steps can be used with different key words: such as "good work" for tasks correctly completed (rewarding) and "wrong result" for tasks incorrectly completed (penalizing).

After a triggering event is detected, an apex controller may take one or more of the following actions for the subject autonomous machine:
- transfers the control of the autonomous machine to a person to be controlled manually;
- transfers the control over to a backup set of ImNNs;
- transfers the control over to a backup set of ImNNs and then transfer the control over to a person;
- transfers the control over to a set of emergency procedures and notifies a person to take over the control of the autonomous machine;
- stops the operation of the autonomous machine;
- initiate a self-shutdown of the autonomous machine; and/or
- re-train ImNN(s) resulting in adjustments to the nodal values of the ImNNs, either the full set of nodal coefficients or a subset thereof using (e.g., incremental re-training as described above).

This step of action(s) taken by an apex controller (e.g., a trigger event controller shown in FIG. 18) is described in more detail with various embodiments of the present invention herein.

In other exemplary embodiments, the two or more different types of triggering event can be detected, each type of triggering event resulting in a different outcome: e.g., a shutdown, a partial shutdown, shutdown only the operational ImNN while operating using a backup ImNN—while re-training off-line the ImNN that operationally caused a triggering event.

In some embodiments, an apex controller can stop the operation of another device, or provides a signal/information to another device that uses the signal/information to perform an action. For example, an apex controller can send a message indicating the triggering event is detected (e.g., a text message or an email or any other type of electronic message via a wired or wireless connection to the owner of the autonomous machine being controlled by the apex controller), can sound an alert (e.g., audio, light, etc.) in the area of the autonomous machine being controlled by the apex controller, or can send information to another machine that may use the information as an input for subsequent actions (e.g., subsequent control or communication actions).

3.c. Implementation Neural Networks Connected in Series, Parallel, and Combination FIG. 8 shows an exemplary embodiment of a run-time control engine, which includes an apex controller 801 connected to a number of ImNNs 803, 805. Each ImNN receives a different set of input data (i.e., from Input #1 807 to Input #n 809, in which n represents an integer number) and generates a different set of output data (i.e., from Output #1 811 to Output #n 813, in which n represents an integer number). Although FIG. 8 illustrates that all sets of input to ImNNs and output from ImNN are connected to the apex controller 801, in some embodiments, not all input and output are required to be connected to the apex controller 801. In FIG. 8, the ImNNs 803, 805 are connected in parallel. That is, the output from one ImNN is not used as input to another ImNN.

As illustrated in FIG. 9, in some exemplary embodiments ImNN(s) 901, 903 can be connected in series. That is, output data from one ImNN is input to a different ImNN. In particular, output from ImNN#1 905 is fed as input to ImNN#2, and so on until output 907 from ImNN#n−1 is fed as input to ImNN#n 903. In an exemplary embodiment, in an autonomous robot, the output from an ImNN that processes visual information can be serially connected with, that is the output is sent to, another ImNN that further processes the information.

In yet other exemplary embodiments as shown in FIG. 10, some ImNN can be connected in a combination of parallel and serial ImNNs. In an exemplary embodiment, e.g., in an autonomous robot, the processing of the voice, visual, and/or touch sensory data can be performed by a neural network for each type of data in parallel, while another ImNN can be provided to further process the output data from the implementation neural networks that processed the voice, visual, and/or touch sensory data.

Figure 11:
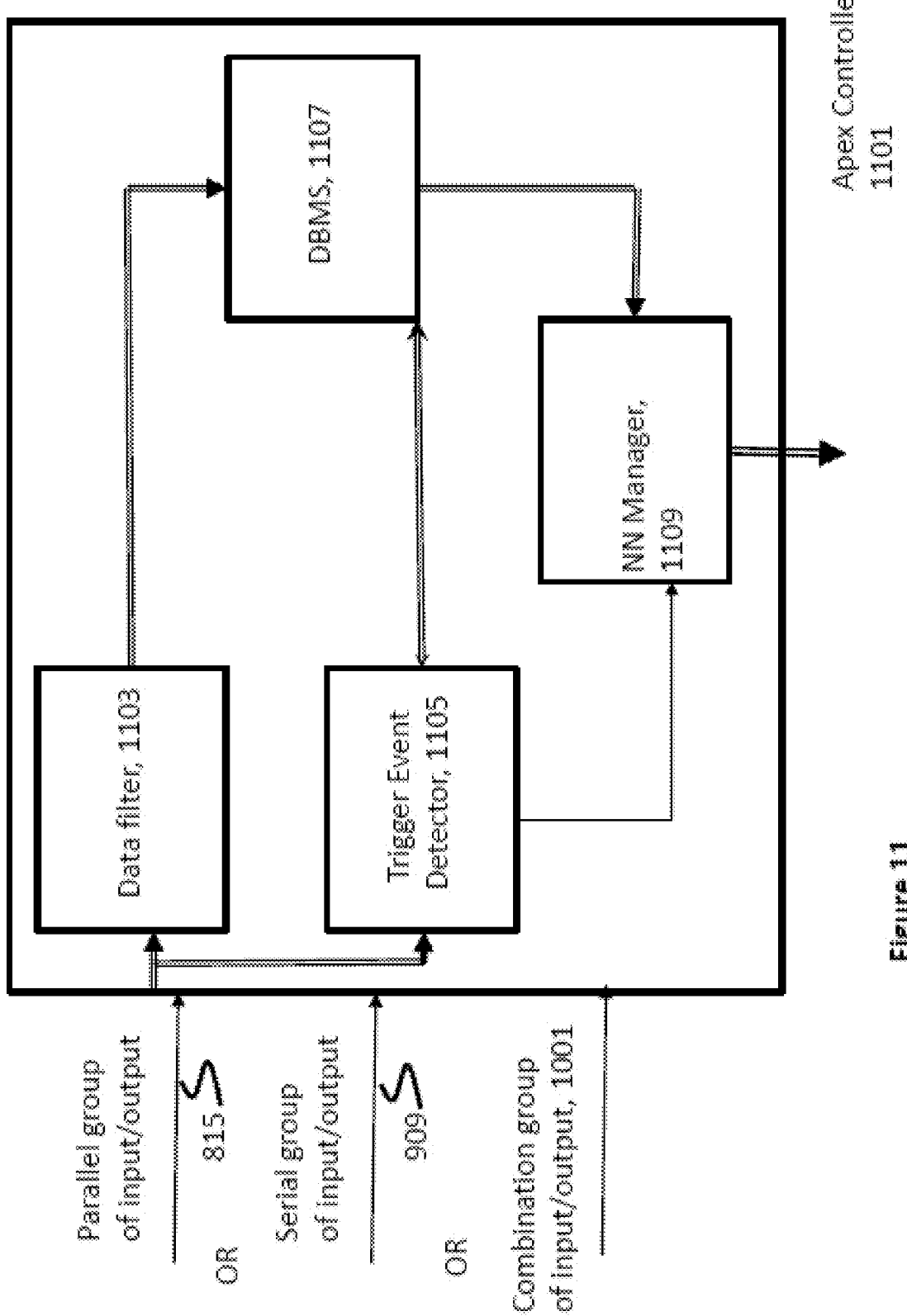
FIG. 11 is a block diagram illustrating a embodiment of components within the apex controller.

In turning to FIG. 11, an apex controller 1101 can be configured to execute (e.g., control/manage/manipulate) various ImNNs connected thereto. It should be noted that FIG. 11 illustrates three different groups of input and output connections. These grouping are to be understood as alternative embodiments. That is, for an apex controller for ImNNs connected in parallel depicted in FIG. 8, the input and output group 815 includes the input/output combination bounded by a dotted-box designated as parallel group of input/output 815 in FIG. 8. For an apex controller for a serially connected ImNN depicted in FIG. 9, the input and output group 909 includes the input/output combination bounded by a dotted-box designated as serial group of input/output 909 in FIG. 9. For an apex controller for a combination of parallel and serially connected ImNNs depicted in FIG. 10, the input and output group 1001 includes the input output combination bounded by a dotted-box designated as combination group of input/output 1001 in FIG. 10. Also the double line arrow at the bottom of the apex controller 1101, shown in FIG. 11, depicts the links to various ImNNs that allows the apex controller 1101 to execute (e.g., control/manage/manipulate) ImNNs connected thereto. As describe herein, when an apex controller executes an ImNN, at least in some embodiments, the apex controller instantiates, initiates, runs (e.g., loads the executable of the ImNN to the CPU and the system memory, feeds input data and collects output therefor), and/or terminates ImNN.

Figure 15:
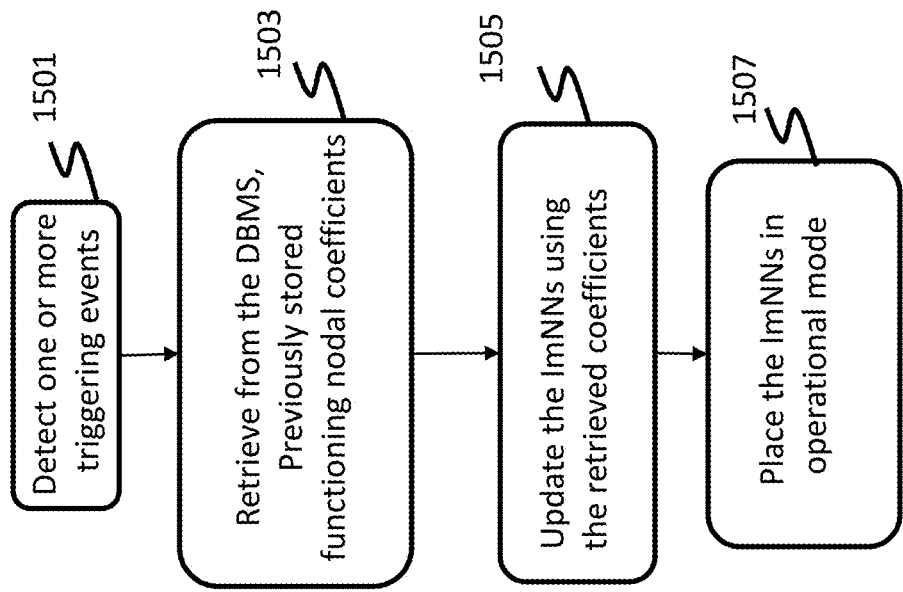
FIG. 15 is a flow chart illustrating a set of steps executed in a embodiment in replacing the coefficients of the ImNN with a previous version.

Some features of the apex controller 1101 depicted in FIG. 11, common among the apex controllers shown in FIGS. 8, 9, and 10, includes a data filter 1103 connected/coupled to a trigger event detector 1105 and a database management system ("DBMS") 1107, and a neutral network manager ("NN Manager") 1109 connected/coupled to the trigger event detector 1105 and the DBMS 1107. The inputs to and outputs of the ImNNs (that are input data to the apex controller) are provided to the data filter 1103 and the trigger event detector 1105. The apex controller 1101 stores and then can later retrieve all or selected input-output data on/from the DBMS 1107. The DBMS 1107 also stores and then can retrieve previous versions of nodal coefficients of all or selected ImNNs and/or the global training data set used to train the ImNN initially (e.g., foundation data set). It should be noted that the DBMS 1107 (and other embodiments of DBMS) is capable of retrieving what it stores. The NN Manager 1109 can re-train ImNN(s) when one or more triggering event is detected from the corresponding ImNN(s). In some exemplary embodiments, the NN Manager 1109 is configured to re-train one or NNs using locally collected training data (e.g., data collected by the autonomous machine) and/or with the foundation data set, incrementally as described above. In some embodiments, the NN Manager 1109 is configured to retrieve an older version of nodal coefficients as described in connection with FIG. 15 below. In some embodiments, the NN Manger is configured to instantiate, terminate, or re-train one or more of the ImNNs as triggering event is detected from output from one or more ImNNs.

In some embodiments, an apex controller is a protected entity that should not be modified or re-trained (if a neural network is included). In some embodiments, if a portion of the apex controller (e.g., the neural network manager) is modified, it is a triggering event that may lead to shutting down of an apex controller.

Although FIG. 11 shows the apex controller 1101 including the DBMS 1107, in other embodiments the DBMS 1107 is a separate unit outside of the apex controller 1101 but operatively connected thereto. The DBMS 1107 is capable of storing the initial set of training data/coefficients for each ImNN(s). The DMBS 1107 is also capable of storing all or filtered input/output data pairs of each ImNN. The data filter 1103 selects input/output data to be saved in the DBMS 1107 to re-train the ImNN(s). In some exemplary embodiments, the filtering/selecting is performed using a statistical sampling method such as the Gibbs sampling method or more generalized Monte Carlo estimate method of all input/output pairs. In some exemplary embodiments, the filtering/selecting can be performed by a neural network located in the data filter 1103 after being trained at a central location and being deployed. In some exemplary aspects of such an embodiment, the filtering/selecting neural network cannot be modified/adjusted once deployed onto an autonomous machine as such a neural network is part of the apex controller 1101. In some embodiments, the similarities between the new sample pairs and the stored samples from the same ImNN can be compared. If the similarities are within a certain range (e.g., within two standard deviations of the stored sample data), the new sample can be stored into the DBMS 1107.

In some embodiments, the filtering/selecting is based on monitoring the output data of an ImNN. That is, if output data is within the normal operation (e.g., within predetermined boundary conditions) for the ImNN, the output data is selected to be stored onto the DBMS. In some other embodiments, the filtering/selecting is based on input from the user of the autonomous machine. That is, if the user affirms the correct sequence of output data (e.g., performing a commanded task issued by the user) by giving a sign (e.g., verbal, gesture, or typing) to the autonomous machine, sequence of the input-output data pair are stored in the DBMS as a category of affirmed data sets. In these exemplary embodiments, the affirmed data sets can be used re-train the ImNN periodically or after a triggering event is detected.

In some embodiments, the neural network manager 1109 can perform a periodic re-training using the input and output stored during the period (e.g., a day, a week, a month, etc.) provided no triggering event occurred during the period. In some embodiment, the DBMS 1107 can store previous nodal values for an ImNN (e.g., three previous versions of nodal values stored in the DBMS) in order to restore if a triggering event is detected (e.g., a virus attack is detected).

In some embodiments, the data filter 1103 passes to store on the DBMS 1107 only those input-output combinations having outputs that do not cause a triggering event (e.g., output within boundary conditions). In these embodiments, the re-training can be more efficiently conducted because only new "training" data set is within the boundary conditions.

Figure 12:
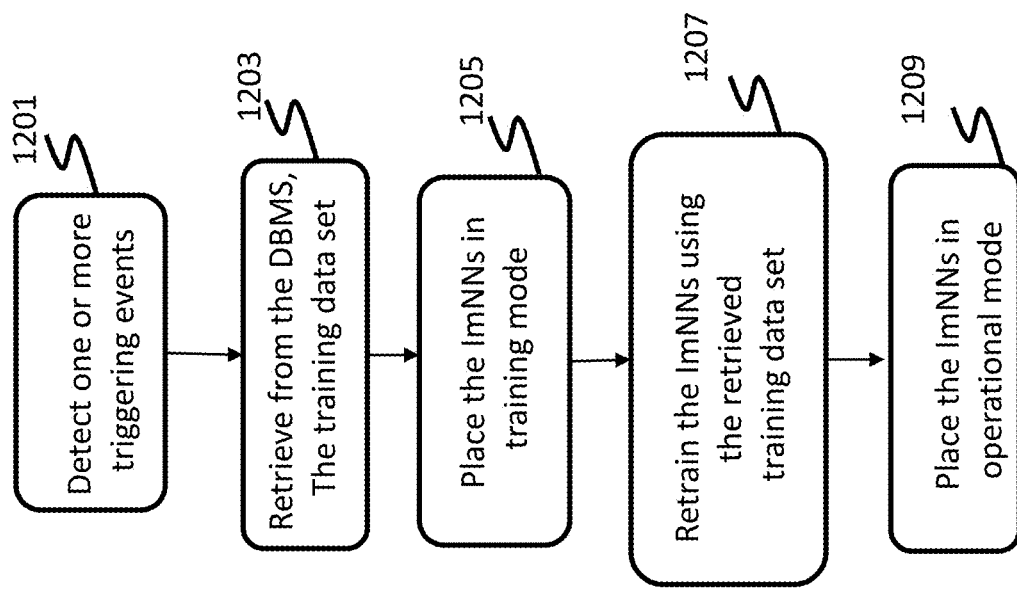
FIG. 12 is a flow chart illustrating a set of steps executed in a embodiment in re-training ImNN.

As FIG. 12 illustrates, the steps performed when an apex controller 1101 decides to re-train one of the ImNN(s) (e.g., when a triggering event is detected for the ImNN). The trigger event detector detects a triggering event, step 1201. The apex controller 1101 retrieves from the DBMS 1107 the training data set for the ImNN (i.e., the ImNN that caused the triggering event) that has been stored in the DBMS, step 1203. The apex controller 1101 (e.g., using the NN Manger 1109) also places the ImNN off-line (e.g., a substantially identical or a copy of the ImNN can become operational during the training) into a training mode, step 1205. Then, the neural network manager 1109 re-trains the ImNN using the retrieve training data set from the DBMS, incrementally, step 1207. That is, the ImNN "learns" new class information without "forgetting" the old class information gained using the previously trained data set(s). Example embodiments in preventing "catastrophic forgetting" is described below. The NN Manager 1209 places the ImNN in operation after the re-training, step 1209.

As described above, ImNNs can be re-trained, and in some instances repeatedly re-trained as outputs therefrom breach boundary conditions. Or, in some embodiments, ImNN(s) are periodically re-trained (e.g., (i) at a certain time duration, for example, every hour of operation without causing a triggering event, or (ii) when some condition occurs or re-occurs and certain number of times). When ImNNs are re-trained repeatedly, one or more ImNNs may exhibit symptoms of forgetting and, extreme cases, ImNNs may cause what is known as "catastrophic forgetting." In various embodiments of the present invention, boundary conditions can be used to prevent forgetting by ImNNs in general and catastrophic forgetting in particular.

Figure 13:
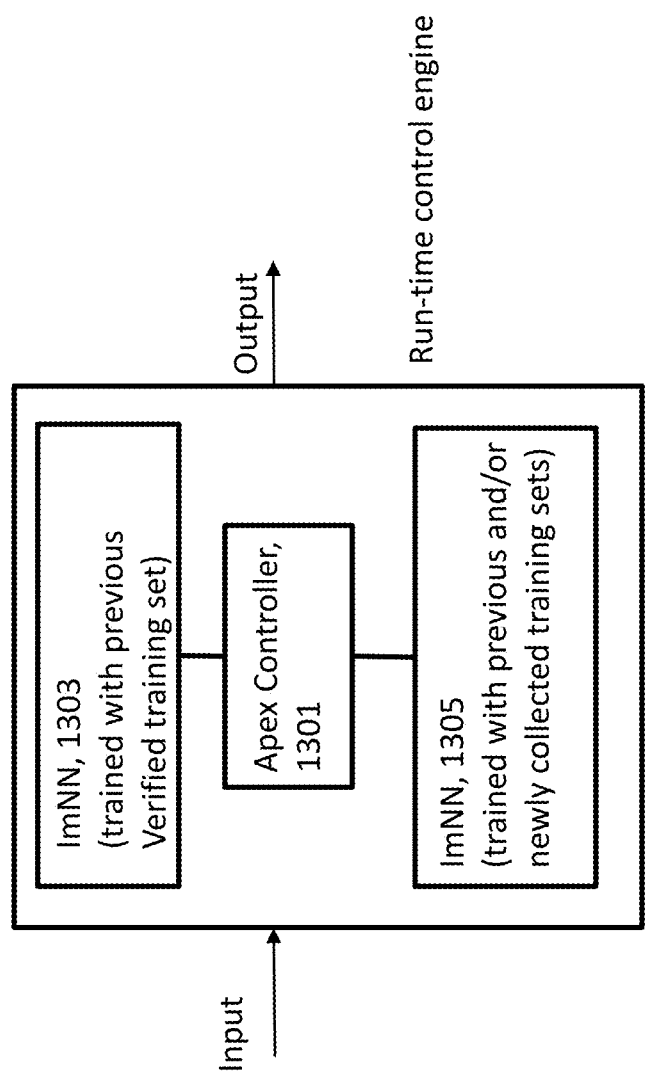
FIG. 13 is a block diagram illustrating a embodiment of a run-time engine that includes a back-up ImNN for updating an ImNN with incremental training data set.

More specifically, FIG. 13 shows an example embodiment run-time control engine that includes an apex controller 1301 with two ImNNs: first ImNN 1303 that is operational and is trained with a previous verified training set (i.e., initially the previous verified training set is the foundation training data set), and second ImNN 1305 that is trained with the training data that includes the previous verified training data set and/or newly collected training set (e.g., on-device collected training data set). Here, the "previous verified" training data set refers to training data set used to re-train ImNN (e.g., 1303) that is now operational.

Figure 14:
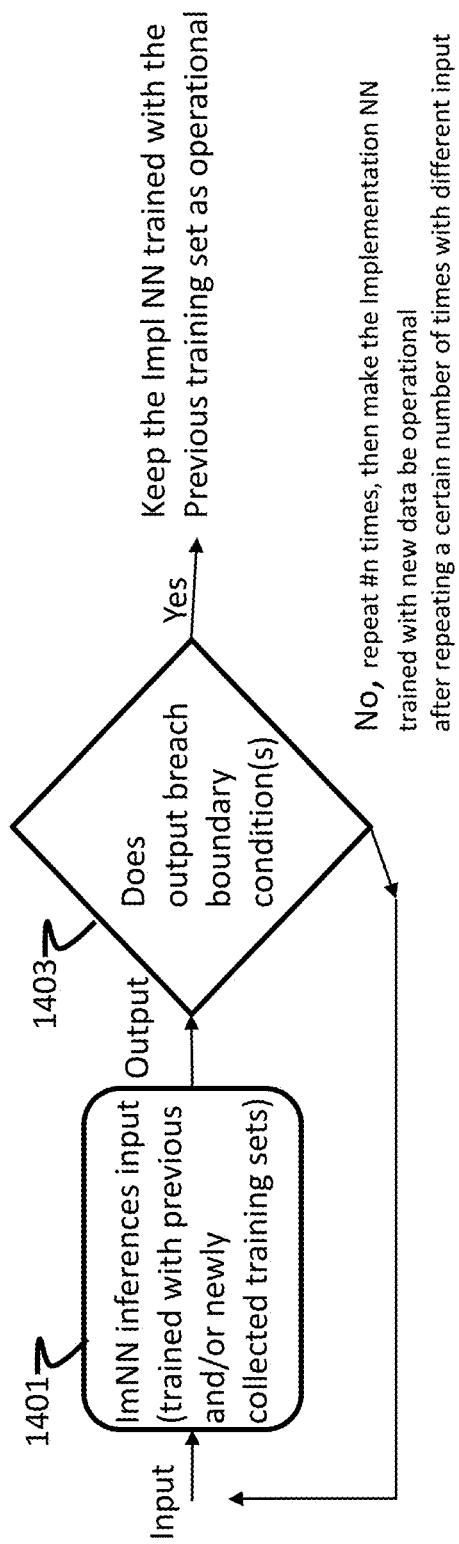
FIG. 14 is a flow chart illustrating steps performed in an incremental update of an ImNN.

In particular, FIG. 14 illustrates the exemplary "verifying" steps. That is, after an ImNN is trained with the previous verified training set and/or newly collected training data set, the ImNN 1305 is fed with a number of random input data. In some embodiments, a set of "testing" data can be stored. In such embodiments, the testing data set can be selected to ensure the outputs therefrom should not breach boundary conditions. Whether the input data includes random and/or test data, the ImNN 1305 inferences the input data, step 1401. The output from the inference step is compared against boundary conditions, step 1403. The steps of inferencing and comparing can repeat until all or a substantial portion of the random and/or test input data is run through the ImNN 1305. If none of the input data causes the ImNN 1305 to breach the boundary conditions, the training data used to train the ImNN 1305 is determined to be "previous verified training set" and the apex controller 1301 makes the newly trained ImNN 1305 operational, while keep the ImNN 1303 as a back-up or re-retain with the same training data set that trained the ImNN 1305. If one or more of the input data causes the ImNN 1305 to breach one or more boundary conditions, the new training data set is discarded and the apex controller 1301 keeps ImNN 1303 operational. With respect to the number of times for repeating the inferencing step using different input data to complete the verifying step would depend on various factors. For instance, the number to repeat could be proportional to the size of the foundation training set, the size of new training data set, and/or the ratio between the foundation and new training data set.

Also, as ImNNs are re-trained and verified, the nodal coefficients are preferably stored and then retrieved from a DBMS. For instance, if the apex controller detects a triggering event caused by ImNN 1303, the previous stored nodal coefficients can be re-used on the ImNN 1303. In particular, an example embodiment may perform the steps illustrated FIG. 15 for retrieving and re-using previously stored nodal values. In referring back to FIG. 11, the previous nodal values for all ImNNs, preferably trained with verified training data set, can be stored into the DBMS 1107. When the triggering event detector 1105 detects a triggering event (step 1501), the apex controller 1101 optionally retrieves the previously stored nodal coefficients from the DBMS for the particular ImNN that caused the triggering event (step 1503). The neural network manager 1109 assigns each node of the affected ImNN with the corresponding nodal value retrieved from the DBMS, step 1305. The apex controller 1101, using the NN Manger 1109, then places the ImNN in operation, step 1307.

The above described various exemplary apex controllers can be implemented on an application specific integrated chips (as in hardware) or on a more general CPU, graphical/neural network accelerator, or digital signal processing chip(s) as computer program (e.g., on a virtual machine) and/or firmware. In some other exemplary embodiments, portions or all of, the controller can be implemented on one or more computer chips designed to run neural networks.

As an example of an implementation embodiment of the ImNNs connected in parallel, a controller for a refrigerator may include an ImNN to control the temperature of the ice maker while controlling the temperature of the food compartments with a different ImNN connected in parallel. In another exemplary embodiment, a robot may have one ImNN for visual perception, another ImNN for voice perception, another for touch perception, and etc.—all connected in parallel. In these embodiments, the input-output pairs can be separately filtered/selected and stored onto the DBMS for later retrieval.

It should be noted that, although FIG. 11 depicts the DBMS as being a part of the apex controller, the DBMS can be located outside the apex controller. In some exemplary embodiment, the DBMS is located within the autonomous machine operatively couple to the apex controller. It should also be noted that the data filer and DBMS can be configured to store only input data (in case of unsupervised learning is implemented, instead of supervised learning by storing and using input and output pairs). In some embodiments, the data filter and DBMS are configured to filter and store rewarding and penalizing commands in case of reinforcement learning are implemented. It should also be noted that the lines (without arrows) between the various apex controllers in FIGS. 8, 9 and 10 and the respective ImNNs signifies that the apex controller controls/manages the ImNN connected by those lines (without arrows).

In connection with FIGS. 7, 8, 9, 10, 18 and 23 herein, various ImNN layouts are described. Although those embodiments are illustrated with only one set of ImNN(s) to be initiated and run, a duplicate copy of the ImNN(s) can be initiated and run as well. Using the simplest example embodiment in FIG. 7, FIG. 16 shows two substantially identical ImNN (e.g., having the same structure of nodes and layers) are trained with the same training data at the central location (alternatively, one ImNN can be trained that then its network structure and nodal coefficient values can be copied to the second ImNN). One of the two set is used operationally and the other ImNN is used as a backup.

In some embodiments, the apex controller can be implemented on a firmware to increase the security integrity, while the ImNN(s) can run on a virtual machine. In those embodiments, the two set of ImNN can run on two different virtual machines. That is, the back-up ImNN(s) can run on one virtual machine, while the other set of ImNN(s) can run on another virtual machine, as illustrated in FIG. 16. In such an embodiment, if one set is corrupted by a virus attack, the virtual machine that the corrupted set was running on can be turned off, while the other virtual machine can be brought on-line.

The two ImNN are continually trained on the autonomous machine after being deployed, whenever the operational ImNN is trained. As noted, in this exemplary embodiment, only one ImNN is used to during the operation of the autonomous machine, while the other ImNN is used as a backup. In some exemplary embodiments, when a triggering event is detected, the ImNN used during the operation is shutdown while the ImNN used as backup is put to service to be operational for the autonomous machine.

In particular, as shown in FIG. 17 timing diagram, the ImNN and back-up ImNN that can operate simultaneously are depicted by two arrows. During this period, only the output data from the ImNN is used for controlling the machine. This period will continue until the apex controller detects an output by the ImNN that exceeds a boundary condition (or said differently, a trigger event detector detects a triggering event). In the second period depicted in FIG. 17, the ImNN no longer is operational, as illustrated having no arrow running. The back-up ImNN takes the place of the now-off-line ImNN to be operationally connected. During this period, ImNN can be re-trained either with the foundation samples or foundation plus incremental samples. Once, the training is completed, the ImNN is put on line again to run as operational. In order to make the back-up ImNN substantially identical to the ImNN, the back-up ImNN can be trained on the same foundation plus incremental samples. This step is optional. The fourth time period depicted in FIG. 17 is same as the first time period during which the ImNN and the back-up ImNN are run simultaneously, while only the ImNN is operationally connected.

3.d. Instantiating Implementation Neural Networks

Figure 18:
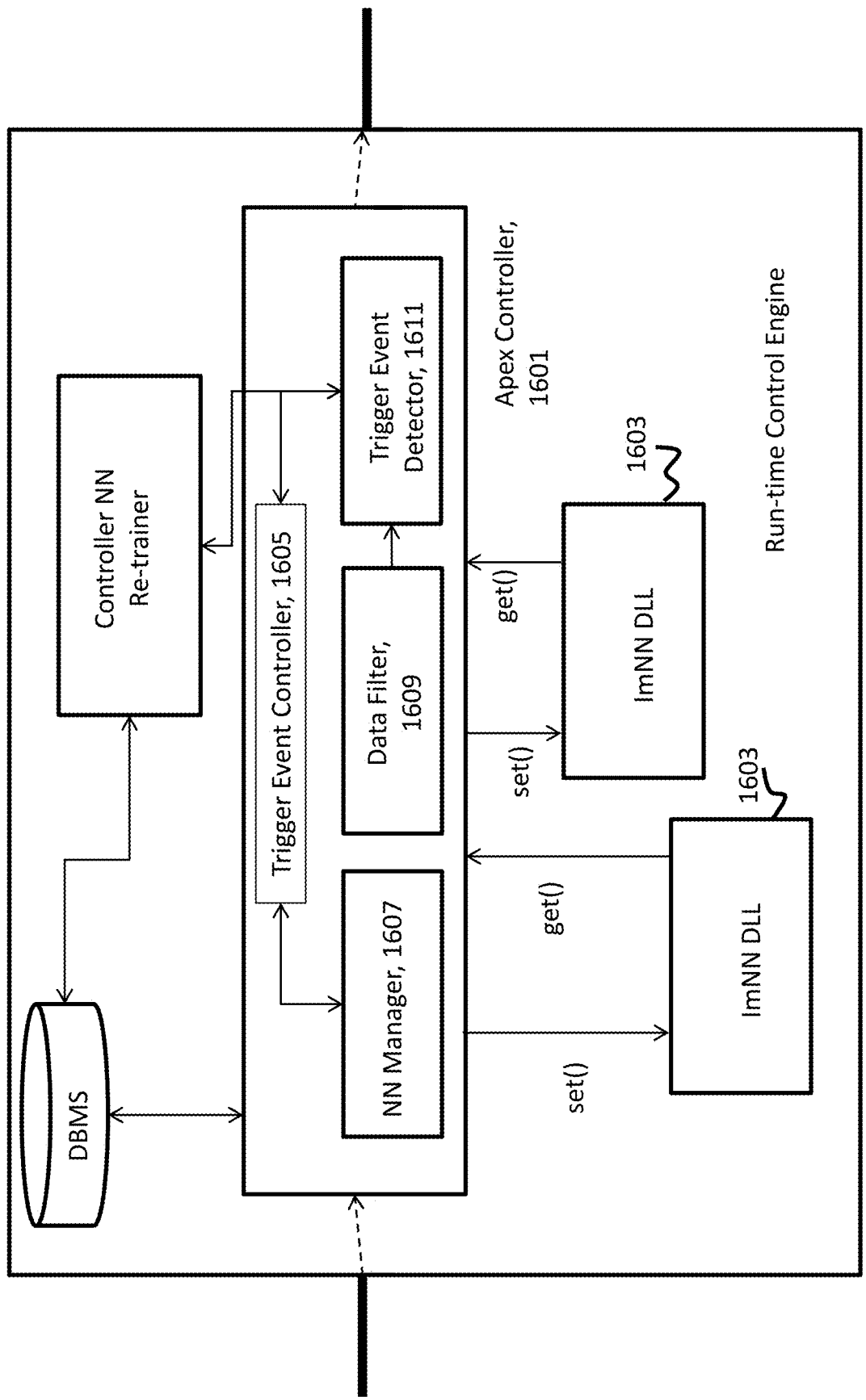
FIG. 18 is a block diagram illustrating an exemplary exemplary embodiment for ImNNs implemented using dynamic loading of neural network(s)

FIG. 18 illustrates a particular exemplary embodiment. In this exemplary embodiment, an apex controller 1601 (e.g., controller logic) instantiates ImNNs 1603 through the use of dynamically loaded libraries (DLL). The DLL can implement a specific interface in order to communicate to the apex controller. The example specification includes the following:

String getNNName( ); // return name String

String getNNDescription( ); // returns name String

String getNNWeights( );

setNNWeights(void);

setNNWeights(String XMLDoc)

setNNInputData(String XMLDoc)

String getNNStatus( ); // returns XML doc

String getNNOutputData( ); // returns XML doc

The apex controller 1601 can dynamically load the ImNN library into the apex controller's memory. Upon initialization, a handshake is made to capture the ImNN name and description (e.g. String getNNName( ), String getNNDescription( ), respectively). Additionally, the default/deployed initial nodal weights are retrieved by the apex controller 1601 and stored within a DBMS (e.g. String getNNWeights ( )). The default weights are set (e.g., the initial nodal coefficients received at the factory), using in memory settings, for the ImNN (e.g. setNNWeights(void)). These weights can be override using an XML string tailored to the ImNN's configuration (e.g. setNNWeights(String XMLDoc)). Once the default weights (e.g., initial weights) are loaded, the ImNN is ready to accept input data.

In other aspects of some embodiments, the apex controller 1601 feeds (rather than just receiving as in other embodiments) input data and retrieves output results (e.g. class types, decisions) through the set and get functions respectively (e.g. setNNInputData(String XMLDoc), String getNNOutputData( ), respectively). The apex controller 1601 ingests all input data in an XML format through an input messaging channel, then pushes the data directly into the ImNN with the setNNInputData(String XMLDoc). As the ImNN evaluates (i.e., inferences) the input data, it sets a status to either COMPLETE, WARNING, ERROR, or INFO. If the status update is COMPLETE, the apex controller 1601 retrieves the output data using getNNOutputData( ) method. The output data is self-described in the XML format. It is further utilized in the trigger detector. Any WARNING, ERROR, or INFO status returned is sent to the trigger event detector 1611 for disposition to include DBMS logging, input data analysis, and error handling. Additionally, the incomplete status message is published to the output messaging channel.

In various exemplary embodiments of the present invention, the controller can analyze all output data for anomalies by some of these methods:

External source thresholding (e.g. prediction defies laws of physics)

External statistical analysis (e.g. prediction generates highly improbable physical response, highly irregular response generated)

Internal statistical analysis (e.g. prediction defies input data statistical probabilities)

Compares results with a different neural network with different weight settings for consistent results.

If a triggering event is detected by the trigger event detector 1611, the apex controller 1601 can unload the ImNN DLL from memory. Then the apex controller 1601 can re-initiate the ImNN with the default weights, updated weights based on training with current input and output data (or some subset sample therein), or updated weights based on a request from a DBMS. If a triggering event is detected, the apex controller 1601 updates the output messaging channel with an incomplete status message and neural network disposition (e.g. reset to defaults, reset based on new training data, exited with error). If the output data is not a triggering event, the output data is exported out of the system on the output messaging channel. It should be noted that, although only ImNNs in parallel are illustrated, the embodiment shown in FIG. 18 can be extended to include ImNNs in series or in combination of serial and parallel connections. In the embodiment depicted in FIG. 18, the trigger event controller 1605 includes features of the apex controller 1601 without the specific features that belong to the NN Manager 1607, Data filter 1609, and trigger event detector 1611 as described herein.

Figure 19:
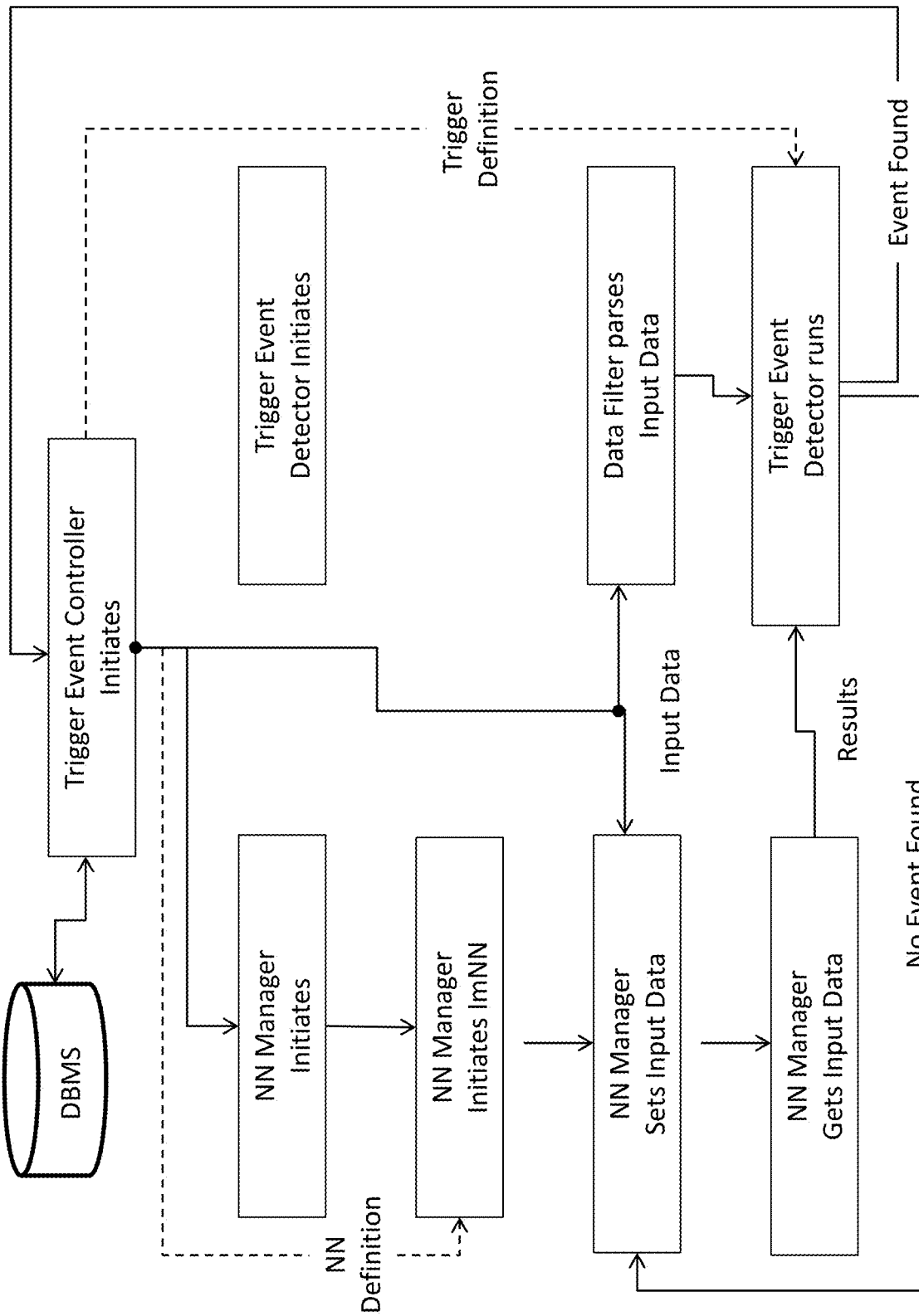
FIG. 19 is a flow chart illustrating implementing and running ImNNs using dynamic loading of neural network(s)

FIG. 19 is a flow chart illustrating example steps of initiating (e.g., defining variables with values for instantiated executable objects) various routines. The run-time control engine initiates an apex controller, although in some embodiments the apex controller is deployed onto a firmware, which would not require instantiating and/or initializing. The apex controller in turn initiates a neural network manager with the initial set of nodal values. When running (e.g., the CPU is executing instructions of the initialized routines), the neural network manager "sets" input data and "gets" output data of the ImNN. The results are sent to the trigger event detector, which is initialized earlier. While the trigger event detector is running, it detects a trigger event. When such an event is detected a notice is sent to the apex controller.

4. Exemplary Industrial Application: Autonomous Land Vehicle

Figure 20:
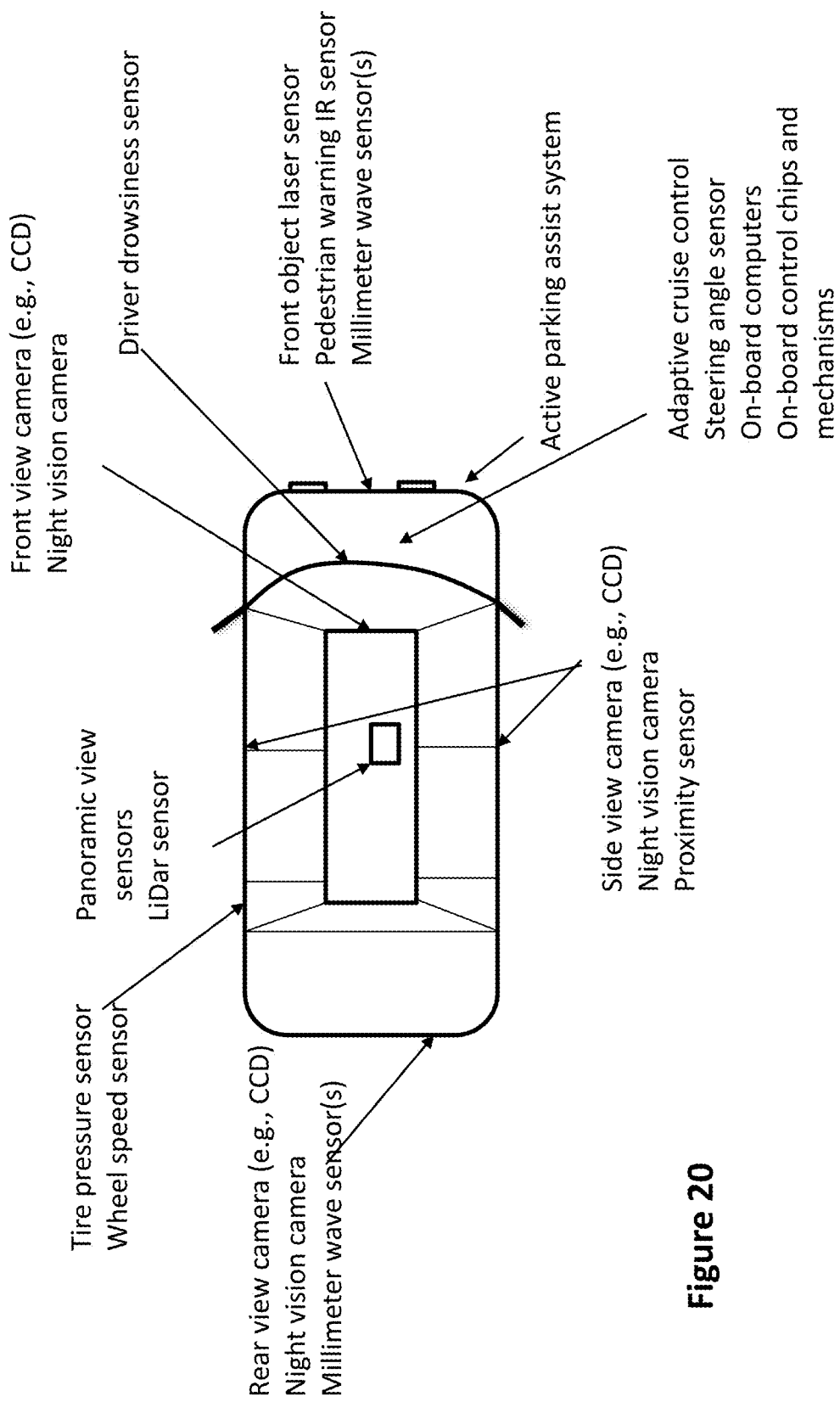
FIG. 20 is a top view of an exemplary embodiment of an autonomous vehicle of the present invention.

FIG. 20 illustrates an autonomous land vehicle with a number sensors and internal computing devices designed to travel in traffic with other land vehicle. Sensors for collecting external surrounding information include one more front view cameras (e.g., digital camera), a night vision camera(s), a front object laser sensor(s), front and rear millimeter radars and sensors, an ambient light sensor, pedestrian/animal detecting IR sensor (s), a side view camera(s) on each side, a night vision camera(s) on each side, a proximity sensor(s) on each side, a panoramic/wide angle view sensor(s) (e.g., 100 degrees, 180 degrees, and/or 360 degrees view digital cameras), a LIDAR sensor, a tire pressure sensor for each mounted tire, a wheel speed sensor for each wheel, a rear view camera(s) (e.g., digital camera), and/or a review view night vision camera(s). As used herein, a "camera" is a broad term and refers to any of a number of imaging devices/systems that collect data representative of an "image" (e.g., a one or multi-dimensional representation of information) with one or more sensors (e.g., film or one or more electronic sensors), unless the context of the usage indicates otherwise. The number of cameras and sensors having various views may be mounted on an autonomous land vehicle so that, preferably, there are no gaps or blind spots either going forward or backward. In some embodiments of the present invention, the autonomous vehicle operates substantially similarly either the vehicle is moving "forward" or "backward." In other words, the rear camera functions as the front camera is the vehicle is moving in the backward direction.

Sensors for collecting operational information include a driver drowsiness sensor, steering angle sensor, a throttle (e.g., gas pedal) pressure sensor, and/or a bread pedal sensor. In addition to sensors, the autonomous vehicle may also include communication devices to send and receive data from a network (e.g., cell phone network, Wi-Fi, GPS and/or other types of communication networks that provide secured communication method) and from other vehicle via vehicle-to-vehicle communication networks (e.g., VANETs) that provides secured communication links.

The autonomous vehicle may be configured to include a communication device (e.g., a cell phone, radio, or the like) on its own or include a docking system to connect to a communication device. If the autonomous vehicle include a docking system to connect to a cell phone and has no other means of connecting to the cell phone network, such a vehicle may provide an additional anti-theft feature by disabling the automated driving function or disabling the entire driving function without being connecting to the communication network with the communication device.

Systems for controlling the autonomous vehicle includes adaptive cruise control, an on-board computer(s), one or more control chips and/or control mechanisms to control the breaking, throttle, and steering wheel systems. An "autonomous vehicle" as used herein is a broad term and does not necessarily mean a completely automated driverless vehicle that requires no human intervention, but may require a qualified person to take over the control (e.g., driving) in certain circumstances (e.g., a triggering event is detected), and such a person can be on or in the vehicle, or be otherwise controlling or monitoring, or capable of controlling or monitoring, the vehicle from an off the vehicle location. When a person takes over the control, such an event can be referred to as a disengagement event.

Embodiments of an autonomous vehicle may also be capable of connecting to a network(s) and integrating data available therein with the various data from the sensors described in connection with FIG. 20. The level of integrations can depend on the range from the autonomous vehicle. In particular, the range can be divided into a number of regions as illustrated in FIG. 21, which shows three regions, not on scale. Data integration region 1 (Region 1) is a region immediate to the subject autonomous vehicle so that individual vehicles can be identified or is within a breaking distance within Region 1. Data integration region 2 (Region 2) could be a region that may affect the traffic within in a certain driving time-distance (e.g., 1 minute). Region 2 could be, for example, within 1000 feet of the subject vehicle. Data integration region 3 (Region 3) could be a region to show the general map information with rudimentary traffic information. Although in this example embodiment, three data integration regions are described, the present invention contemplates two or more regions. The example two regions can be Region 1 and Region 3. In such an exemplary embodiment, one display monitor (e.g., a screen) can be selectively (or in combination) and graphically show Region 1 information and Region 3 information. In various embodiments, the regions may be differently shaped and/or differently sized. For example, a regions in "front" of a vehicle (that is, at least partially in the expected/ predicted path of the vehicle or adjacent to the path of the vehicle may be larger than a region behind the vehicle, or to the side of the vehicle. In various embodiments, one or more of the regions may be asymmetrical. In various embodiments, one or more of the regions may be partially surrounding the vehicle.

In various embodiments, Region 3 would include available map data as used on a "navigation" system of conventional vehicles. Such displays may also overlay traffic information by integrating the map data with traffic information broadcast over a terrestrial FM band or satellite channel. The range of Region 3 can be selected to be displayed by a user, as in the conventional system display systems. In various embodiments, Region 2 includes more detailed information, such as precise location of accidents that are within a certain range (e.g., 500 ft) to allow the navigation system to identify alternative routes to drive the autonomous vehicle. Region 2 data can also include information on approaching road construction work zone(s), emergency vehicles, and large vehicles with the range of Region 2 that are broadcast over the network and/or detectable by one of the sensors mounted on the autonomous vehicle. In various embodiments, Region 1 integrates available data as may needed to build the graphical information for displaying surrounding vehicles with the most detailed information among various Regions. The available data includes the map data, traffic data, GPS location information, and/or output data from various sensors shown in connection with FIG. 20.

FIG. 22 illustrates an example embodiment of a two-dimension display (e.g., a screen) for rendering available information in Region 1, in order to visually communicate with the driver the condition of the immediate surrounding in real-time. As illustrated, displayable information may include traffic lanes and other vehicles. Although only dotted lines are illustrated, various traffic lines such as solid or broken white lanes single or double yellows lines can be graphically displayed—straight or curved. Also, although only similar sized graphical objects representing surrounding vehicles are illustrated, the sizes of the surrounding vehicle can be graphically rendered to be proportional to detected size of the vehicles. In addition, although a traffic pattern of three lanes traveling in the same direction is illustrated, one lane, double lane, opposite traffic, and surrounding buildings can also be graphically rendered on the display. It should also be noted that, although a two-dimensional display is used to illustrate the relevant inventive features of the present invention, a three-dimensional display can also be glass block (e.g., a quantum-dot doped liquid crystal) can be used to display the surrounding information. In such a three-dimensional display, the information can be updated each a fraction of second but may not be necessary to update at a video speed.

Vehicles surrounding the subject vehicle can be, for example, autonomously driven vehicles, type 1 vehicles, type 2 vehicles or low-confidence vehicles, each with a different graphical representation. For illustrating as examples only, type 1 vehicles can be vehicle that can be clearly identified as a low-risk vehicle, and type 2 vehicles can be vehicle that cannot be clearly identified as a low-risk vehicle. A low-confidence level vehicle is a vehicle that the apex controller cannot determine with a certain level of conference whether it is a vehicle, no object, or some other object as determined by the apex controller described in connection with FIG. 23. Although the subject vehicle is illustrated to be in the middle of the display, in other embodiments the subject vehicle can be at the bottom and only the vehicles front of the subject vehicle can be displayed (assuming the vehicles rendered as moving from bottom to top).

Figure 23:
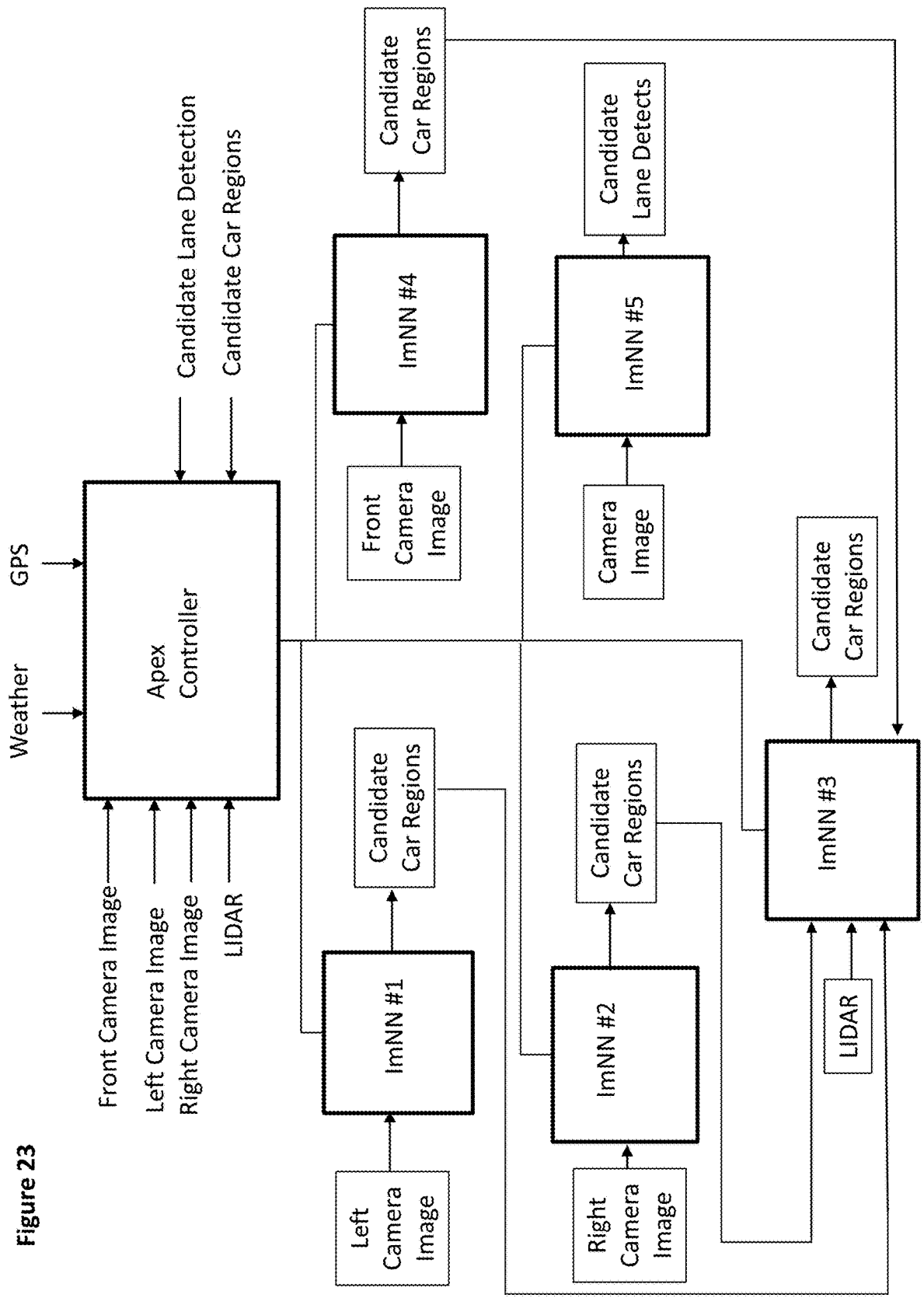
FIG. 23 is a block diagram of a embodiment of a run-time engine for controlling an autonomous automobile with one or more ImNNs receiving input from multiple cameras and other sources.

FIG. 23 is a block diagram illustrating an example embodiment of a run-time control engine used in various embodiments for controlling an autonomous land vehicle. It should be noted that various embodiments of run-time control engine described above in connection with single ImNN, ImNNs in series, in parallel and in combination of serial and parallel can be used to control an autonomous land vehicle. Also, the various embodiments ImNN and various ways to train the ImNN (including incremental training) in Sections 1 and 2 can be used to an autonomous land vehicle.

The run-time control engine includes an apex controller receiving as input data: front camera images, left camera images, right camera images, LIDAR images, and rear camera images (not shown). The apex controller also receives information from the network such as weather information and/GPS information. The run-time control engine may also include ImNN #1 receiving digital image data from the left camera, ImNN #2 receive digital image data from the right-side camera, and ImNN#4 receiving digital image data from the front side camera. Although not shown, another ImNN, referred to herein as a Rear ImNN, can be provided to receive images from the rear side camera or in an alternative embodiments, ImpleNN4 can receive rear side images as well as front side images and process corresponding images as the autonomous vehicle is moving forward or backward. The run-time control engine may also include ImNN #3 receiving image data from the LIDAR sensor.

In some embodiments, each of the ImNN#1-#4 and Rear ImNN mentioned are structured and trained to process the received images to identify and locate candidate regions on the corresponding received images where other vehicles are detected to be located. In an alternative embodiment each of the Impl#1-#4 and Rear ImNN includes multiple stage neural networks: a first stage neural network structured and trained to process the corresponding received image data to extract geometrical feature information such as shape information and/or segmentation information; and a second stage neural network for each of the first stage neural network structured and trained to identify candidate car regions in the received images. In example embodiments, the aforementioned neural networks in ImNN#1-#4 and Rear ImNN can be structured by using a convolutional neural network structure, recursive neural network and/or other neural network structures mentioned in Section 1 above. It should be noted that, although not shown in FIG. 23, data buses connect various ImNNs for sending and receiving various input/output data. Such data buses include function(s) to synchronize data transfers. For instance, the input data to ImNN #3 includes outputs from ImNN #1, #2, and #4 and images from the LIDAR sensor. The clock cycles to process the camera images to generate outputs from ImNN #1, #2, and #4 would then be accounted for (e.g., delayed) so that when ImNN#3 processes the outputs and ImNN #1, #2, and #4 and the images from the LIDAR sensor, the time when the LIDAR image is taken is substantially the same as the time at which the images received by the ImNN #1, #2, and #4 to generate the corresponding output data are taken.

The run-time control engine may also include ImNN#6, not shown in FIG. 23, which receives candidate car regions from ImNN#1, #2, and #4 and/or Rear ImNN. Input images to ImNN6 are synchronized. The ImNN#6 is structured and trained to use the candidate car regions and register them with each other. That is, the images of a vehicle located on the left front of the subject vehicle would be captured by the left side camera, front camera, panoramic/wide angle camera, and/or the LIDAR. When the ImNNs process the images, they would have identified as the candidate car regions corresponding to the vehicle located on the left front. Those candidate car regions are combined to into one candidate car region by ImNN#3.

Optionally, an image processor, not shown in FIG. 23, is included within or outside of the run-time controller engine. The image processor receives images from the left, right, front, and/or rear camera as well as images from the LIDAR. The images from various sources are synchronized so that images taken substantially at the same time are processed together. The image processor creates registered/combined image using the Lidar image or panoramic/wide angel camera image as the base image and inserting the images from the front, side, and/or rear cameras. The image insertion process can use simple cut and paste method or known image blending methods used when images from different sources (e.g., having different resolutions) are merged together to form one image. Such merged images can be communicated to a remote locate for a person located there to view the images either on two dimensional display screen or on a virtual reality viewer.

When the subject autonomous vehicle is driving through a non-optimal condition, the apex controller can cause the driving mode to change. That is, although the subject vehicle can be autonomously driven under an optimal condition, the driving mode may need to be changed to manual when the condition is less than optimal. For instance, less than optimal condition may include: one or more camera(s) or corresponding ImNN are malfunctioning causing mis-registration(s) among candidate car regions (e.g., the ImNN processing the LIDAR image indicates a presences of a car in the front, while the ImNN processing the front camera indicates no vehicle in the front), inclement weather, and/or other vehicles moving around the subject vehicle have potential for misbehaving. The malfunction can be caused by dust on the lens, sun-glares, and/or the other vehicle having substantially the same color as the sky/overpass/trees/other general background colors to momentarily confuse the ImNN(s). With regards to other vehicles moving around the subject autonomous vehicle having a potential for misbehaving, this can be determined by whether the other vehicles around the subject autonomous vehicle are driven autonomously or manually. If manually driven, there is a higher possibility of misbehaving (e.g., due to the lack of the driving experience or due to mischievous intents). In particular, once the vehicles located around the subject autonomous vehicle are identified on the images (i.e., a "new" vehicle appearing within Zone 1) further information is collected about them: the new vehicles can be determined to be autonomously driven by establish car to car communication link (e.g., VANET); and/or the portion of the image segmented as the new vehicle may be further processed by another neural network (this neural network is connected serially to one of the ImNNs) for locating, segmenting, and understanding the license plate information. If the license plate information is extracted, the information can be used to search for accident and other historical information associated with the vehicle to estimate the possibility of misbehaving.

Vehicles located within Zone 1 are continually monitored by the apex controller and the ImNNs for tracking each vehicle's driving behavior—such as, whether a vehicle is driving erratically, whether a vehicle is driving too fast or slow or change speed, whether a vehicle is keeping the applicable traffic regulations. All available information of each vehicle in Zone 1 is then fed into a logic/algorithm for generating information for the display described in connection with FIG. 22. In particular, in an exemplary embodiment: a vehicle identified as an autonomously driven vehicle could be given a low risk car rating (to be graphically rendered as green); a vehicle identified and tracked to be driving with the traffic regulations but not an autonomously driven vehicle may be given a type 1 rating, indicating not as safe as a low risk car but no reason to be concerned; and a vehicle identified as not an autonomously drive vehicle and also is being tracked as erratically driving by violating one or more traffic regulations (e.g., changing lanes without signals, speeding, etc.) may be given type 2 rating, indicting a vehicle to pay attention. The appearance of type 2 vehicle may lead to a potential disengagement event.

More specifically, an apex controller is configured to receive various outputs from ImNN and other information (e.g., time of the day, visibility, weather information, traffic information, and the confidential level mentioned above). The apex controller by processing the information available to it can be configured to determine an overall confidence level. In determining the overall confidence level, the ImNN can be configured to receive environmental information (e.g., the weather conditions, road conditions, availability of the sun light, and etc.). If the overall confidence level falls below a certain level or can be predicted to fall below a certain level, the apex controller can be configured to give a warning signal for the automated driving mechanism to be disengaged.

In various embodiments, when the mode changes to the manual control, a driver located within the vehicle can be first warned by an alarm that he/she needs to pay attention to the driving condition and may need to take over the control of the subject vehicle. In some embodiments, such a driver can be located at a remote location away from the subject vehicle. Such embodiments include communication links (e.g., mobile phone network) to send a warning notice to take over the control of the vehicle and the merged images to the driver at the remote location, a two-way communication device between the autonomous land vehicle and the remote location. At the remote location, the driver is provided with a two-way communication device to receive the warning notice and the merged images to be shown on a display screen or on a virtual reality viewer. A user interface device(s) (e.g., a joy stick and/or steering wheel with two pedals) are also provided so that the driver can remotely control the driving of the subject vehicle. In some embodiments, the remote location can be configured to communicate and control (if necessary) more than one autonomous land vehicles.

In another aspect of various embodiments, the data from night vision cameras can also input to additional ImNN(s) to be registered with the images with other cameras. In these embodiments, the apex controller receives input from the ambient light sensor. When the apex controller determines it is dark by using the output of the ambient light sensor, the apex controller can direct the registration ImNN to start using the output from the night vision cameras.

Figure 24:
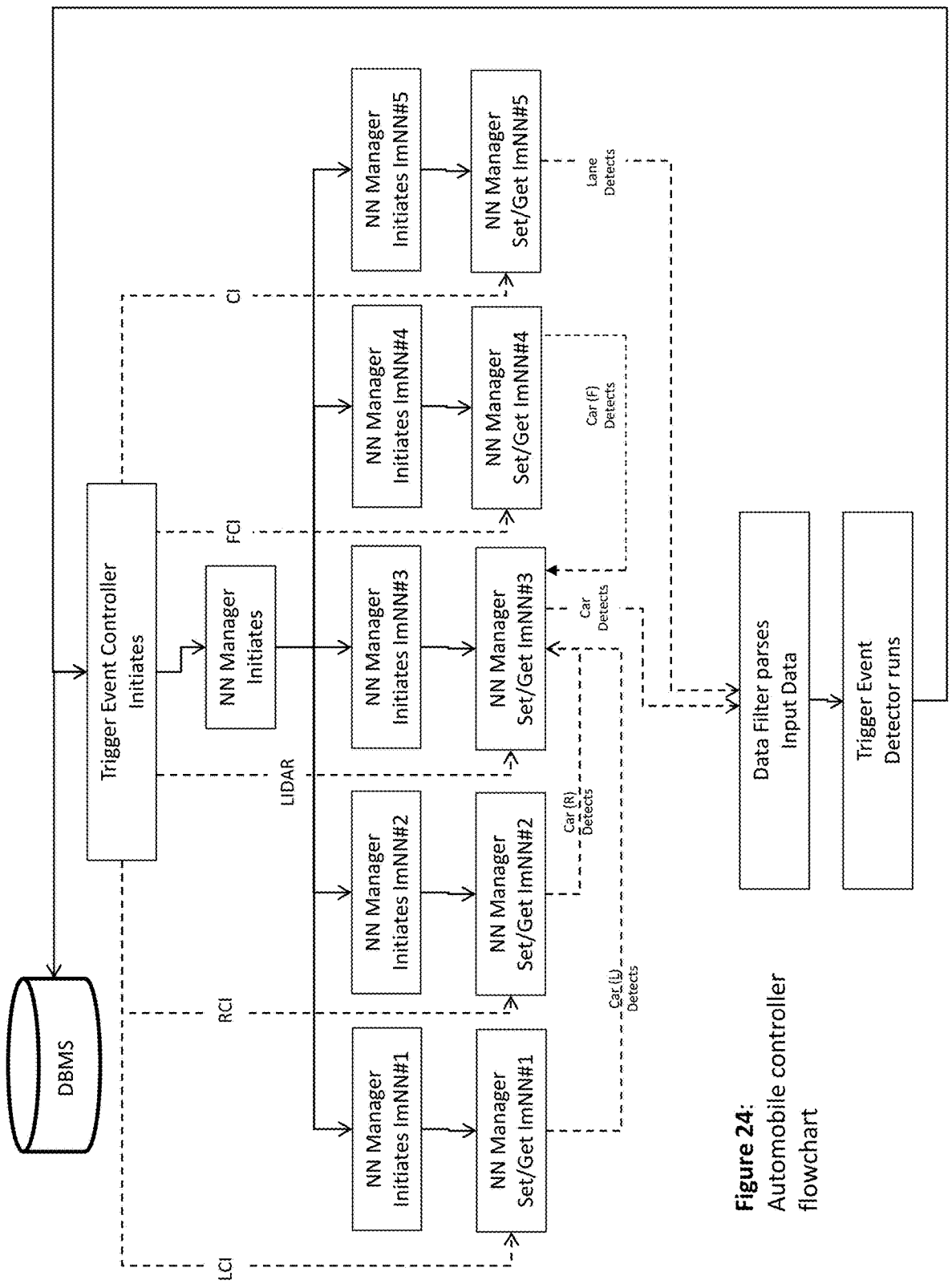
FIG. 24 is a flow chart of example steps to execute the run-time engine for controlling an autonomous automobile of the present invention.

FIG. 24 is a flow chart illustrating instantiating various routines. The run-time control engine initiates an apex controller (although in some embodiments the apex controller is deployed onto a firmware, which would not require instantiating). The apex controller in turn instantiates the ImNN(s) described above in connection with FIG. 23.

Although Section 4 provides exemplary industrial application embodiments in terms of autonomous land vehicles, features of describe therein can be also utilized in other industrial applications such as robotics and IoT applications.

5. Pseudo-Computer Program of an Example Embodiment of the Present Invention

The pseudo-computer program provided in the section below is a implementation of a embodiment of the present invention. In particular, APEXController performs the following steps:

a) determines, using the command line arguments, the NN implementation class name and potentially a backup or secondary NN implementation class name.

b) initializes a class called APEXNN. Note that the implementation class name (in this example, it is called TestNN) which is capable of both inheriting the APEXNN class and implementing the APEXInterface. This ensures that access to the methods is available to the APEXController main section and ensures that the correct methods are completely implemented by the dependent section(s).

c) dynamically loads the primary NN and if specified, the backup NN. The resulting dynamic allocation does not require pre-compiled knowledge of the class. Also, APEXController has need to have the insight into the inter-workings of the dynamically loaded NN.

d) determines if the NN's have been pre-trained or trained on instantiation. If not, the NN's are trained using the appropriate method.

e) initiate APEXInputDataHandler based on the command line arguments. All input data can be pulled directly from the APEXInputDataHandler. This class can be modified to support multiple sources (e.g. database, files, real-time feeds, sensor feeds).

f) initiate APEXNNTrigger based on the command line arguments. This class can be modified to support multiple trigger types (e.g. comparisons with static values, database values, backup NN results, etc.). The APEXNNTrigger can also be modified to support actions post triggering event detection.

g) runs through input data gathered from the APEXInputDataHandler and compares results with the APEXNNTrigger conditions. If a triggering event is detected, this example embodiment shows exiting. In this example embodiment, the APEXController continues to run until the data provided stops being produced.

```
/* Main driver program for APEXController */ import java.lang.reflect.Constructor;

import java.lang.reflect.Method;

import java.util.*;

public class APEXController { public static void main(String[] args) {

// Find out the number of arguments
        // if args > 1 then primary NN is 0, backup NN is 1

String primaryNNClassName = null;
        String backupNNClassName = null;
        boolean hasBackup = false;
```

```
// Check the main arguments
if (args.length > 2) {
        primaryNNClassName = new String(args[1]);
        backupNNClassName = new String(args[2]);
        hasBackup = true;
} else if (args.length > 1) {
        primaryNNClassName = new String(args[1]);
} else {
        System.out.println("APEX requires class name.");
        System.exit(-1);
} try {
        // Initialize primary, backup APEX NNs
        APEXNN primaryNN = null;
        APEXNN backupNN = null;

// Generate the APEX NN object from the ClassLoader
        APEXClassLoader apCL = new APEXClassLoader();
        primaryNN = apCL.invoke(primaryNNClassName, "getNN");

// Check if the NN is trained.  If not, train the NN.
        if (!(primaryNN.getNNtrained())) {
                try {
                        primaryNN.trainNN();
                }
                catch (Exception e) {
                        e.printStackTrace();
                        System.exit(-1);
                }
        }
```

```
// If the APEXController configuration has a backup
if (hasBackup) {
        // Generate APEX NN object from the ClassLoader
        APEXClassLoader abCL = new APEXClassLoader();
        backupNN = apCL.invoke(backupNNClassName, "getNN");

// Check if the NN is trained. If not, train.
        if (!(backupNN.getNNtrained())) { try {
                        backupNN.trainNN();
                }
                catch (Exception e) {
                        e.printStackTrace();
                        System.exit(-1);
                }
        }
}

// Initialize APEX input data
APEXInputDataHandler inputData = new APEXInputDataHandler(args[0]);
double[] inputs = new double[inputData.getInputSize()];
        int cycleIndex = 0;

// Initialize APEX trigger event
        APEXNNTrigger apexTrigger = new APEXNNTrigger(args[0]);
```

```
// Initialize output data
double outputPrimary = -1;
double outputBackup = -1;

// Continually loop over input data
while (cycleIndex >= 0) {
        // Get input data
        inputs = inputData.getInput(cycleIndex);

try {
                // Perform inference on primary
                outputPrimary = primaryNN.inferenceNN(inputs);

// If APEXController has a backup,
                // inference with backup
                if (hasBackup) {
                        // Perform inference on primary
                        outputBackup = backupNN.inferenceNN(inputs);
                }
                // Validate output primary
                if (outputPrimary < 0) {
                        cycleIndex = -1;
                        throw new Exception("Failed.");
                }
                // Validate output backup
                if ((hasBackup) && (outputBackup < 0)) {
                        cycleIndex = -1;
                        throw new Exception("Failed.");
```

```
            }
            // Look for trigger event.
            double[] output = new double[2];
            output[0] = outputPrimary;
            output[1] = outputBackup;

double[] errors = new double[2];
            if (apexTrigger.triggerEvent(output, errors)) {
                cycleIndex = -1;
                throw new Exception("Triggering.");
            }
        }
        catch (Exception e) {
            e.printStackTrace();
            System.exit(-1);
        }
        cycleIndex++;
        if (cycleIndex > inputData.getCycleMax()) {
            cycleIndex = 0;
        }
      }
    }

// Catch all errors.
    catch (Exception e) {
        e.printStackTrace();
        System.exit(-1);
    }
  }
}
```

APEXClassLoader: Dynamically loads the external NN class into APEX.

```java
/*  APEX generator of APEX NN object */
import java.lang.reflect.Constructor;
import java.lang.reflect.Method;

public class APEXClassLoader extends ClassLoader {
    public APEXNN invoke(String classBinName, String methodName) {
        Object outputObject = null;
        try {
            // Create a new ClassLoader
            ClassLoader classLoader = this.getClass().getClassLoader();

// Load the target class using its binary name
            Class loadClass = classLoader.loadClass(classBinName);
            System.out.println("Loaded: " + loadClass.getName());

// Create a new instance from the loaded class
            Constructor constructor = loadClass.getConstructor();
            Object classObject = constructor.newInstance();

// Get the target method from loaded class and invoke
            Method method = loadClass.getMethod(methodName);
            outputObject = method.invoke(classObject);
        }
        catch (Exception e) {  e.printStackTrace(); }

// Return and cast output object into APEXNN
        return (APEXNN) outputObject;
    }
}
```

}

APEXNNInterface: Class must be implemented by the external NN for APEX compliance.

```
/* APEX Controller Neural Network Interface - all APEX NN
    Interface methods must implement */
public interface APEXNNInterface {
        // Get a handle to this object
        public APEXNN getNN();
        // Get the name of NN
        public String getName();
        // Get state of NN
        public void setNNtrained(boolean isTrained);
        public boolean getNNtrained();
        // Train or re-training input NN
        public void trainNN();
        // Get inference results back from NN
        public double inferenceNN(double input[]);
}
```

APEXNN: Class must be inherited by the external NN for APEX utilization.

```
/* APEX NN */
public class APEXNN {
        String name = new String("APEX NN");
        boolean isTrained = false;

// Constructor
        public APEXNN() {
        }
```

```
// Constructor
public APEXNN(String inName) {
    name = new String(inName);
}
// Get the name of NN
public String getName() {
    return "APEX NN";
}
// Get state of NN
public void setNNtrained(boolean inputIsTrained) {
    isTrained = inputIsTrained;
}
public boolean getNNtrained() {
    return isTrained;
}
// Train or re-training input NN
public void trainNN() {
    // Do training here ...
    isTrained = true;
}
// Get inference results back from NN
public double inferenceNN(double input[]) {
    // Do inference here ...
    return outputData;
}
}
```

APEXNNTrigger: A generic APEXTrigger example.

```
/* APEX Trigger Event */
public class APEXNNTrigger {
```

```java
        private boolean isTriggered = false;

public APEXNNTrigger(String inputDefinitionFile) {
        }
        public boolean triggerEvent(double output[], double error[]) {
            // Do trigger logic here.
            return false;
        }
}
```

TestNN: A generic APEX-enabled external NN.

```java
/* Test NN */
public class TestNN extends APEXNN implements APEXNNInterface {
        private boolean isTrained = false;

public TestNN() {
            super("Test NN");
        }
        // Get a handle to this object
        public APEXNN getNN() {
            return this;
        }
        // Get the name of NN
        public String getName() {
            return new String("Test NN");
        }
        // Get state of NN
        public void setNNtrained(boolean inputIsTrained) {
            isTrained = inputIsTrained;
        }
```

```
        public boolean getNNtrained() {
            return isTrained;
        }
        // Train or re-training input NN
        public void trainNN() {
            System.out.println("NN is trained.");
            //  Do training here ...
isTrained = true;
        }

// Get inference results back from NN
        public double inferenceNN(double input[]) {
          System.out.println("NN results complete.");
          // Do inference here ...
          return outputData;
        }
}
```

Any module, routine or any apparatus configured to perform the functions recited by means described herein, or may be performed by any suitable means capable of performing the corresponding functions. The means may include various hardware and/or software component(s) and/or module(s), including, but not limited to, a circuit, an application specific integrated circuit (ASIC), or processor. Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

As used herein, the term "determining" encompasses a wide variety of actions. For example, "determining" may include calculating, computing, processing, deriving, investigating, looking up (e.g., looking up in a table, a database or another data structure), ascertaining and the like. Further, "determining" may include receiving (e.g., receiving information), accessing (e.g., accessing data in a memory) and the like. In addition, "determining" may include resolving, selecting, choosing, establishing and the like.

The various illustrative logical blocks, modules, processors and circuits described in connection with this disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

As one of skill in the art will appreciate, the steps of a method or algorithm described in connection with the present disclosure may be embodied directly in hardware, in a software module executed by a processor, or in a combination of the two. A software module may reside in any form of storage medium that is known in the art, including memory that may be part of a microprocessor or in communication with a microprocessor. Some examples of storage media that may be used include, but are not limited to, random access memory (RAM), read only memory (ROM), flash memory, erasable programmable read-only memory (EPROM), electrically erasable programmable read-only memory (EEPROM), registers, a hard disk, a removable disk including removable optical media, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein may include one or more steps or actions for achieving a described method. The method steps and/or actions may be interchanged with one another without departing from the scope of the invention. In other words, unless a specific order of steps or actions is specified, the order and/or use of specific steps and/or actions may be modified without departing from the scope of the claims. The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor (e.g., image processor) may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

In some embodiments, the processing system may be configured as a general-purpose processing system with one or more microprocessors providing the processor functionality and external memory providing at least a portion of the machine-readable media, all linked together with other supporting circuitry through an external bus architecture. In some embodiments, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. In some embodiments, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from another storage medium when a triggering event occurs. During execution of the software module, the processor may load some of the instructions into cache to increase access speed. When referring to the functionality of a software module below, it will be understood that such functionality is implemented by the processor when executing instructions from that software module.

Some embodiments may comprise a computer program product for performing the operations presented herein. For example, such a computer program product may comprise a computer-readable medium having instructions stored (and/or encoded) thereon, the instructions being executable by one or more processors to perform the operations described herein. If implemented in software, functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. Thus, in some embodiments a computer-readable media may comprise non-transitory computer-readable media (e.g., tangible media). Combinations of the above should also be included within the scope of computer-readable media.

What is claimed is:

1. An apparatus having a plurality of components, comprising:
   an input device constructed to generate input data;
   a first neural network with at least one hidden layer structured and trained to generate an output by processing input data received from the input device;
   a first processor configured to receive the output from the first neural network and coupled to one of the components of the apparatus, the first processor further configured to control an operation of the one of the components of the apparatus using the output from the first neural network;
   a second neural network, with at least one hidden layer, configured to receive the output from the first neural network, the second neural network structured and trained to generate a control output from the output of the first neural network; and
   a second processor configured to:
      receive the control output from the second neural network, and
      control an operation of the first neural network using the control output from the second neural network, wherein said control an operation of the first neural network includes at least one of terminating the operation of the first neural network or re-training the first neural network.

2. The apparatus of claim 1, wherein the second neural network is further structured to determine whether the output of the first neural network corresponds to a predetermined condition.

3. The apparatus of claim 2, wherein the second processor is configured to terminate operation of the first neural network when the second neural network determines the output of the first neural network corresponds to the predetermined condition.

4. The apparatus of claim 2, wherein the second processor is configured to re-train the first neural network when the output of the first neural network corresponds to the predetermined condition, wherein re-training of the first neural network includes retrieving a stored training data set, placing the first neural network in a retraining mode, retraining the first neural network using the retrieved training data set, and placing the first neural network in an operational mode.

5. The apparatus of claim 4, wherein the second processor is further configured to re-train the first neural network using the input data generated by the input device.

6. The apparatus of claim 1, further comprising:
   a third neural network with at least one hidden layer, the third neural network configured to provide a second output to the second neural network, structured and trained to generate the second output by processing the input data,
   wherein the second neural network is further trained to compare the output from the first neural network and the second output from the third neural network, and detect a difference between the output from the first neural network and the second output from the third neural network, and
   wherein the second processor is further configured to perform a control action if the detected difference corresponds to a predetermined level, wherein said control an operation of the first neural network includes at least one of terminating the operation of the first neural network or re-training the first neural network.

7. The apparatus of claim 6, wherein the second processor is configured to terminate the operation of the first neural network if the detected difference is above the predetermined level.

8. The apparatus of claim 6, wherein the second processor is configured to re-train the first neural network if the detected difference is above the predetermined level.

9. The apparatus of claim 1, wherein the apparatus comprises an autonomous land vehicle and the step of using the obtained output further includes the step of generating a message to control the autonomous land vehicle.

10. A computer-implemented method of controlling an apparatus, the method comprising:
processing input data using a first neural network with at least one hidden layer structured and trained to generate an output by inferencing on the input data;
controlling an operation of an aspect of the apparatus using the output from the first neural network;
generating a control output using a second neural network with at least one hidden layer structured to and trained to generate the control output by inferencing on the output generated by the first neural network; and
controlling an operation of the first neural network using the control output from the second neural network, wherein controlling an operation of the first neural network includes at least one of terminating the operation of the first neural network, re-training the first neural network,
wherein the method is performed by one or more computer hardware processors configured to execute computer-executable instructions on a non-transitory computer storage medium.

11. The computer-implemented method of claim 10, further comprising:
determining whether the output of the first neural network corresponds to a predetermined condition; and
in response to determining that the output corresponds to the predetermined condition, performing an action affecting the operation of the first neural network.

12. The computer-implemented method of claim 11, further comprising terminating the first neural network when the output is determined to correspond to the predetermined condition.

13. The computer-implemented method of claim 11, further comprising re-training the first neural network when the output is determined to correspond to the predetermined condition.

14. The computer-implemented method of claim 11, further comprising generating a human recognizable notification in response to determining the output corresponds to the predetermined condition.

15. The computer-implemented method of claim 11, wherein the the predetermined condition is a condition that indicates the apparatus could be damaged and performing the action prevents damage to the apparatus.

16. The computer-implemented method of claim 10, wherein the apparatus includes a human speech generator comprising a loudspeaker, and controlling the operation using the output includes generating human speech parts to be played on the loudspeaker.

17. The computer-implemented method of claim 10, wherein the apparatus includes an autonomous land vehicle, and controlling the operation using the output includes generating a signal to control an autonomous land vehicle based at least in part on the output.

18. The computer-implemented method of claim 10, wherein the apparatus comprises an image generator.

19. An apparatus having a plurality of components, the apparatus comprising:
an input device constructed to generate input data;
a first neural network with at least one hidden layer structured and trained to generate an output by processing input data from the input device;
a first processor configured to receive the output from the first neural network and coupled to one of the components of the apparatus, the first processor further configured to control an operation of the one of the components of the apparatus using the output from the first neural network;
a second neural network with at least one hidden layer configured to receive the output from the first neural network, the second neural network structured and trained to generate a control output and to determine whether the output corresponds to a predetermined condition; and
a second processor configured to receive the control output from the second neural network, the second processor configured to control an operation of the first neural network using the control output from the second neural network when the output of the first neural network exceeds the predetermined condition, wherein controlling an operation of the first neural network includes at least one of terminating the operation of the first neural network or re-training the first neural network.

20. The apparatus of claim 19, wherein the second processor is further configured to terminate the first neural network when the second neural network determines the output from the first neural network corresponds to the predetermined condition.

21. The apparatus of claim 6, wherein the third neural network is trained identical to the first neural network.

* * * * *